(12) United States Patent
Nichols

(10) Patent No.: US 12,623,748 B2
(45) Date of Patent: May 12, 2026

(54) CONTROLLABLE CYCLE SUSPENSION

(71) Applicant: SRAM, LLC, Chicago, IL (US)

(72) Inventor: Geoff Nichols, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 571 days.

(21) Appl. No.: 16/140,064

(22) Filed: Sep. 24, 2018

(65) Prior Publication Data

US 2019/0092421 A1 Mar. 28, 2019

Related U.S. Application Data

(60) Provisional application No. 62/564,740, filed on Sep. 28, 2017.

(51) Int. Cl.
*B62K 25/08* (2006.01)
*B62K 25/04* (2006.01)
*F16F 9/46* (2006.01)

(52) U.S. Cl.
CPC .............. *B62K 25/08* (2013.01); *F16F 9/463* (2013.01); *B62K 2025/044* (2013.01); *B62K 2201/08* (2013.01); *F16F 2222/12* (2013.01)

(58) Field of Classification Search
CPC .. F16F 9/064; F16F 9/088; F16F 9/092; F16F 9/096; F16F 9/462; F16F 9/46; F16F 9/461; F16F 9/464; F16F 9/466; F16F 9/36; F16F 9/369; F16F 9/463; B62K 25/08; B62K 2025/044
See application file for complete search history.

(56) References Cited

U.S. PATENT DOCUMENTS

| | | | | |
|---|---|---|---|---|
| 4,527,676 A | * | 7/1985 | Emura | F16F 9/462 |
| | | | | 188/266.4 |
| 4,596,320 A | * | 6/1986 | Shimokura | F16F 9/462 |
| | | | | 188/266.4 |
| 4,754,855 A | * | 7/1988 | Kuwana | F16F 9/462 |
| | | | | 188/266.4 |
| 6,105,987 A | | 8/2000 | Turner | |
| 6,149,174 A | | 11/2000 | Bohn | |
| 8,317,171 B2 | | 11/2012 | Inoue | |

(Continued)

FOREIGN PATENT DOCUMENTS

| | | |
|---|---|---|
| CN | 103069191 A | 4/2013 |
| CN | 205220956 U | 5/2016 |

(Continued)

*Primary Examiner* — Robert A. Siconolfi

(57) ABSTRACT

A suspension component for a bicycle is provided. The suspension component includes a first tube having a first end and a second tube having a second end, the first tube and the second tube configured in a telescopic arrangement having the first end as a first distal end of the telescopic arrangement and the second end forming a second distal end of the telescopic arrangement, the telescopic arrangement having an interior space bounded by inner walls of the first tube and the second tube. The suspension component also includes a fluid damper disposed in the interior space, the fluid damper having a plurality of operational states configured to dampen or resist movement of the first tube relative to the second tube. Characteristics of the suspension component are controllable and/or the suspension component is configured to operate in different states.

16 Claims, 23 Drawing Sheets

(56)                    References Cited

U.S. PATENT DOCUMENTS

| | | | | |
|---|---|---|---|---|
| 9,284,014 | B2 | 3/2016 | Mochizuki | |
| 2001/0032462 | A1* | 10/2001 | Beck | F16F 9/064 60/477 |
| 2004/0262859 | A1 | 12/2004 | Turturiello | |
| 2007/0074939 | A1* | 4/2007 | Chen | F16F 9/56 188/297 |
| 2008/0023934 | A1 | 1/2008 | van Houweling | |
| 2008/0023935 | A1 | 1/2008 | McAndrews | |
| 2008/0164674 | A1 | 7/2008 | Chen | |
| 2009/0322054 | A1 | 12/2009 | Becker | |
| 2010/0117322 | A1 | 5/2010 | Achenbach | |
| 2010/0276906 | A1 | 11/2010 | Galasso | |
| 2011/0121525 | A1 | 5/2011 | Shirai | |
| 2011/0181009 | A1 | 7/2011 | Lude et al. | |
| 2011/0202236 | A1 | 8/2011 | Galasso et al. | |
| 2012/0166044 | A1 | 6/2012 | Battlogg | |
| 2013/0068575 | A1* | 3/2013 | Mochizuki | F16D 1/101 188/322.13 |
| 2013/0134688 | A1* | 5/2013 | Mochizuki | B62K 25/08 280/276 |
| 2013/0154209 | A1 | 6/2013 | Haugen | |
| 2014/0316652 | A1 | 10/2014 | Ericksen et al. | |
| 2014/0339034 | A1* | 11/2014 | Mochizuki | F16F 9/34 188/315 |
| 2014/0345411 | A1 | 11/2014 | Miki et al. | |
| 2015/0061241 | A1 | 3/2015 | Walthert et al. | |
| 2015/0175236 | A1 | 6/2015 | Walthert et al. | |
| 2015/0183486 | A1 | 7/2015 | Watarai | |
| 2015/0197308 | A1 | 7/2015 | Butora et al. | |
| 2016/0257370 | A1 | 9/2016 | Hashimoto et al. | |
| 2017/0259876 | A1 | 9/2017 | Ericksen et al. | |
| 2018/0257737 | A1 | 9/2018 | Komatsu et al. | |

FOREIGN PATENT DOCUMENTS

| | | | | |
|---|---|---|---|---|
| DE | 202006005455 U1 * | 6/2006 | | F16F 9/462 |
| TW | M317987 U | 9/2007 | | |
| TW | 200744883 A | 12/2007 | | |
| TW | I351365 | 11/2011 | | |

* cited by examiner

CONTROLLABLE CYCLE SUSPENSION

The present application claims priority to Provisional U.S. Patent Application No. 62/546,740, filed Sep. 28, 2017.

FIELD OF THE DISCLOSURE

The present application generally relates to suspension systems for cycles, and more particularly to a controllable suspension system for a bicycle.

DESCRIPTION OF RELATED ART

Bicycles are known to have suspension components. Suspension components have been used for various applications, such as cushioning impacts, vibrations, or other disturbances experienced by the bicycle during use. A common application for suspension components on bicycles is for cushioning impacts or vibrations experienced by the rider when the vehicle is ridden over bumps, ruts, rocks, pot holes and/or other obstacles. These suspension components include rear and/or front wheel suspension components. Suspension components may also be used in other locations, such as a seat post or handlebar, to insulate the rider from impacts.

For a front wheel, a front fork may include suspension elements such as springs and dampers. Such suspension elements have values and characteristics associated with use in a suspension system. For example, a spring element, such as a coil spring, elastomeric spring, air spring, and/or other spring element will have a spring force value, which may be constant or variable along an established curve depending on the input force or displacement value. It is often desirable to control the effect of such spring elements using a damping element or system. Damping elements in suspensions will also include characteristic values. For example, damping rates, such as rebound and compression rates, may be established based on the physical characteristics of the particular damper and/or suspension system.

The degree of desired damping depends on a variety of variables, such as the speed of the bicycle, the terrain over which the bicycle is being ridden, the structure of the bicycle, the wheel width, and the weight and particular preferences of the rider. It therefore has been desirable to provide adjustable damping characteristics to achieve the widest possible range of damping performance for all classes of bicycles, riders, and terrains. Thus, damping systems have been provided with mechanisms for adjusting the damping rates. These mechanisms have been configured to cause the adjustment of the damping system through cable, hydraulic, pneumatic, electronic, and/or other actuation techniques. Traditionally these mechanisms have involved cumbersome cables, hoses, and/or wires to allow for connection. In addition, these mechanisms have been integrated with sealed pressure and/or fluid chambers, or inadequately configured, thus difficult to service and maintain. Further, many of these mechanisms have involved slow response times when changes to the system are requested and/or initiated.

SUMMARY

In an embodiment, a suspension component for a bicycle is provided. The suspension component includes a first tube having a first end and a second tube having a second end, the first tube and the second tube configured in a telescopic arrangement having the first end as a first distal end of the telescopic arrangement and the second end forming a second distal end of the telescopic arrangement, the telescopic arrangement having an interior space bounded by inner walls of the first tube and the second tube. The suspension component also includes a fluid damper disposed in the interior space, the fluid damper having a plurality of operational states configured to dampen or resist movement of the first tube relative to the second tube. The fluid damper includes an internal fluid portion exposed to damping fluid, an internal dry portion isolated from the damping fluid, and an actuating member disposed in both the internal fluid portion and the internal dry portion, the actuating member configured such that movement of the actuating member causes a change of state of the damper.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed damping system solves or improves upon the above-noted and/or other problems and disadvantages with existing and prior known damping systems. The disclosed suspension component includes multiple suspension states which can be remotely actuated and/or modified. Further, externally disposed portions of the suspension component used in the actuation and/or modification of the multiple suspension states, such as a power supply or other portions, may be disposed in particular positions of the suspension component so as to protect these portions from contact with external hazards such as tree limbs, rocks, etc. with which the suspension component may come into contact during aggressive riding.

Figure 1:
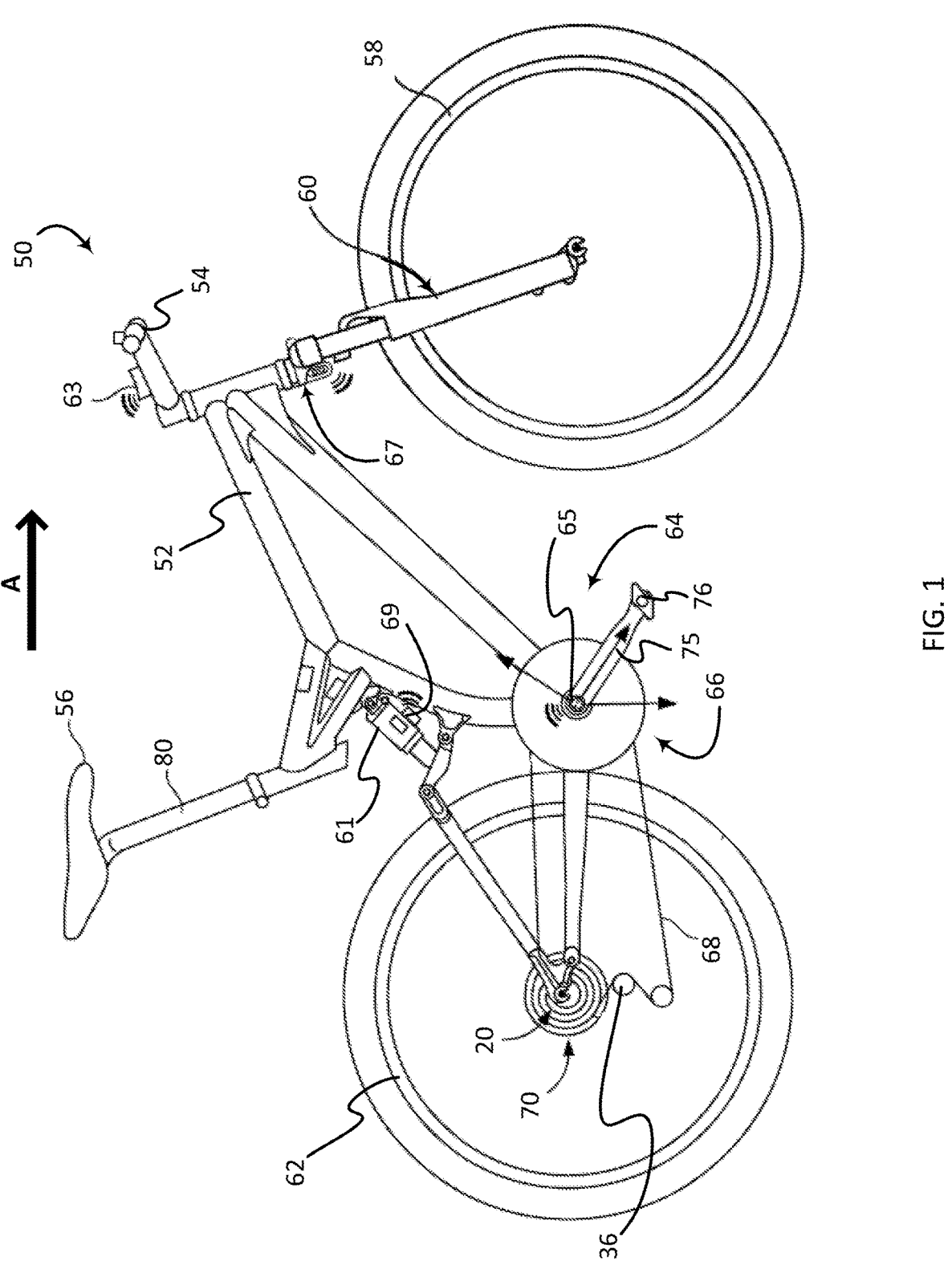
FIG. 1 shows a side view of one example of a bicycle.

Turning now to the drawing, FIG. 1 illustrates one example of a human powered vehicle on which the disclosed controllable cycle suspension may be implemented. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a first or front suspension element, such as a front fork 60, of the frame 52 and supporting the front end of the frame, the front fork 60 constructed in accordance with the teachings of the present disclosure. The bicycle 50 also has a second or rear wheel 62 supporting a rear end of the frame 52. The rear end of the frame 52 may be supported by a second or rear suspension element 61, such as a rear shock. The bicycle 50 also has a drive train 64 with a crank assembly 66 that is operatively coupled via a chain 68 to a rear cassette 70 near the hub providing a rotation axis of the rear wheel 62. The crank assembly 66 includes at least one, and typically two, crank arm 75 and pedal 76, along with at least one front sprocket, or chainring. A rear gear change device 36, such as a derailleur, is disposed at the rear wheel 62 to move the chain 68 through different sprockets of the cassette 70. In an embodiment, a front gear changer device may be provided to move the chain 68 through multiple sprockets of the crank assembly. In the illustrated example, the saddle 56 is supported on a seat post assembly 80.

In FIG. 1, the arrow A depicts a normal riding or forward moving direction of the bicycle 50.

The bicycle 50 may also include a control device 63 that may be provided to control one or more components of the bicycle, such as the front fork 60 and/or the rear suspension element 61. The bicycle 50 may also include a crank assembly activity sensing device 65 configured to determine the activity of the crank assembly 66, or of other parts of the drive train. The control device 63, front fork 60, the rear suspension element 61, and/or the crank assembly activity sensing device 65, as well other sensors in some embodiments, may communicate and/or otherwise share data such as control commands, status indicators, and other data related to the function and/or activity of the bicycle 50. The front fork 60 includes a suspension element, or front fork, control device 67 configured to communicate with the control device 63 and/or other components, such as the crank assembly activity sensing device 65. The rear suspension element 61 may also include a suspension element control device.

While the bicycle 50 depicted in FIG. 1 is a mountain bicycle, the front fork 60, including the specific embodiments and examples disclosed herein as well as alternative embodiments and examples, may be implemented on other types of bicycles. For example, the disclosed front fork 60 may be used on road bicycles, as well as bicycles with mechanical (e.g., cable, hydraulic, pneumatic, etc.) and non-mechanical (e.g., wired, wireless) drive systems. The disclosed front fork 60 may also be implemented on other types of two-, three-, and four-wheeled human powered vehicles as well.

Figure 2:
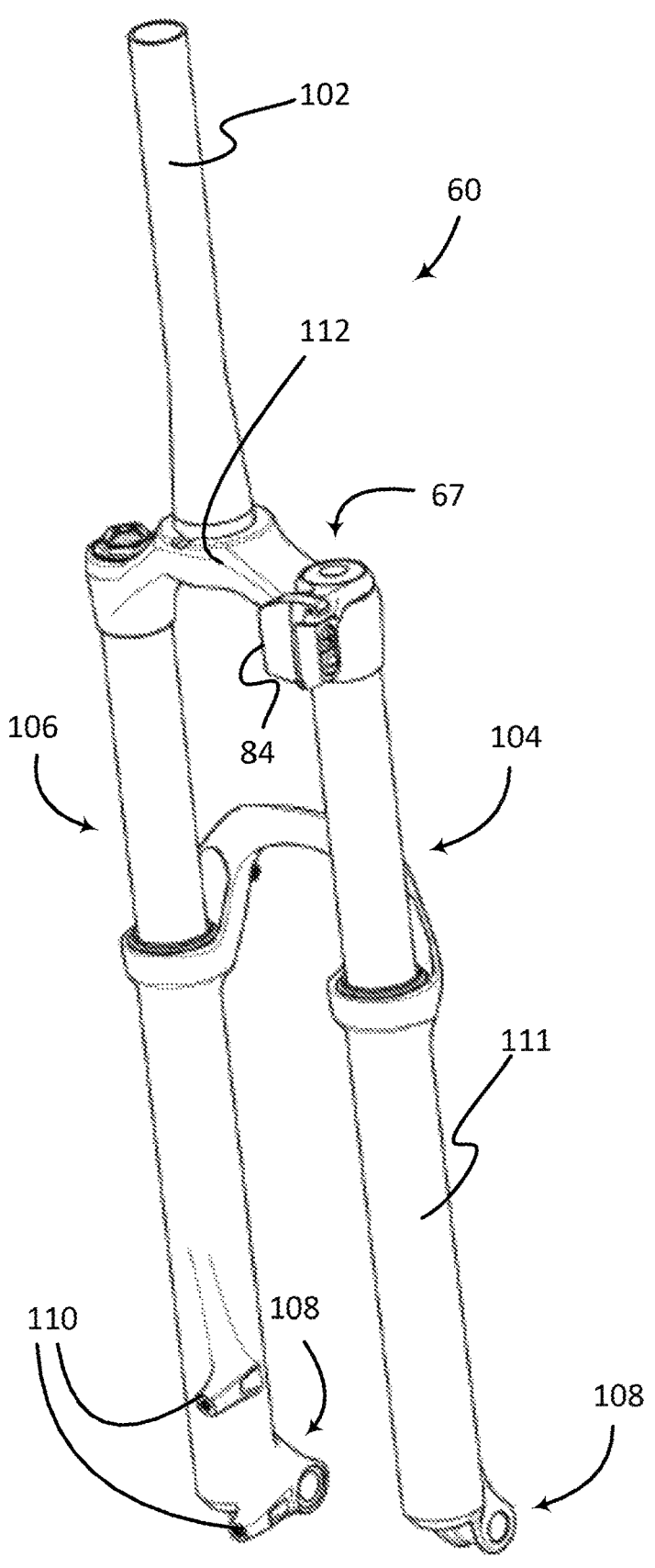
FIG. 2 shows a perspective view of a front suspension component of a bicycle constructed in accordance with the teachings of this disclosure.
Figure 3:
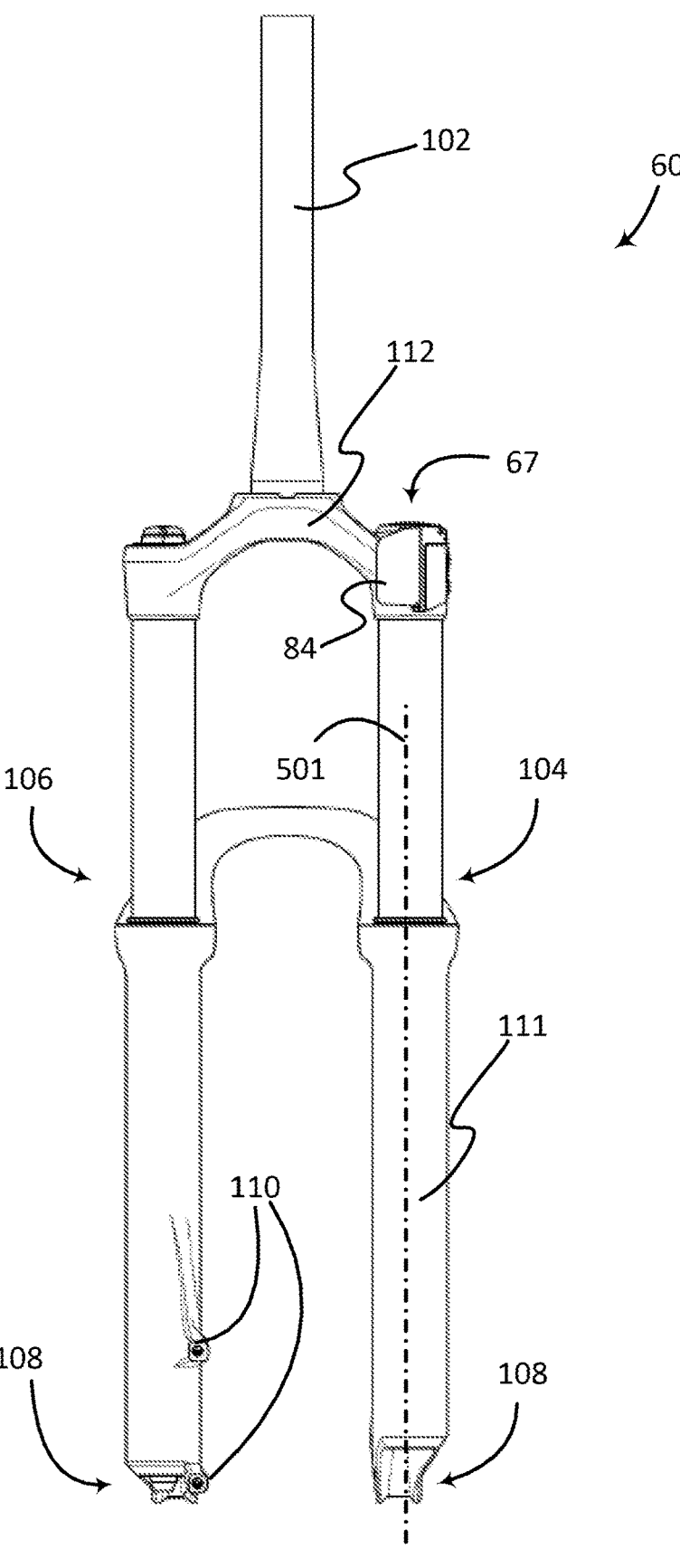
FIG. 3 shows a rear view of the front suspension component of FIG. 2.
Figure 4:
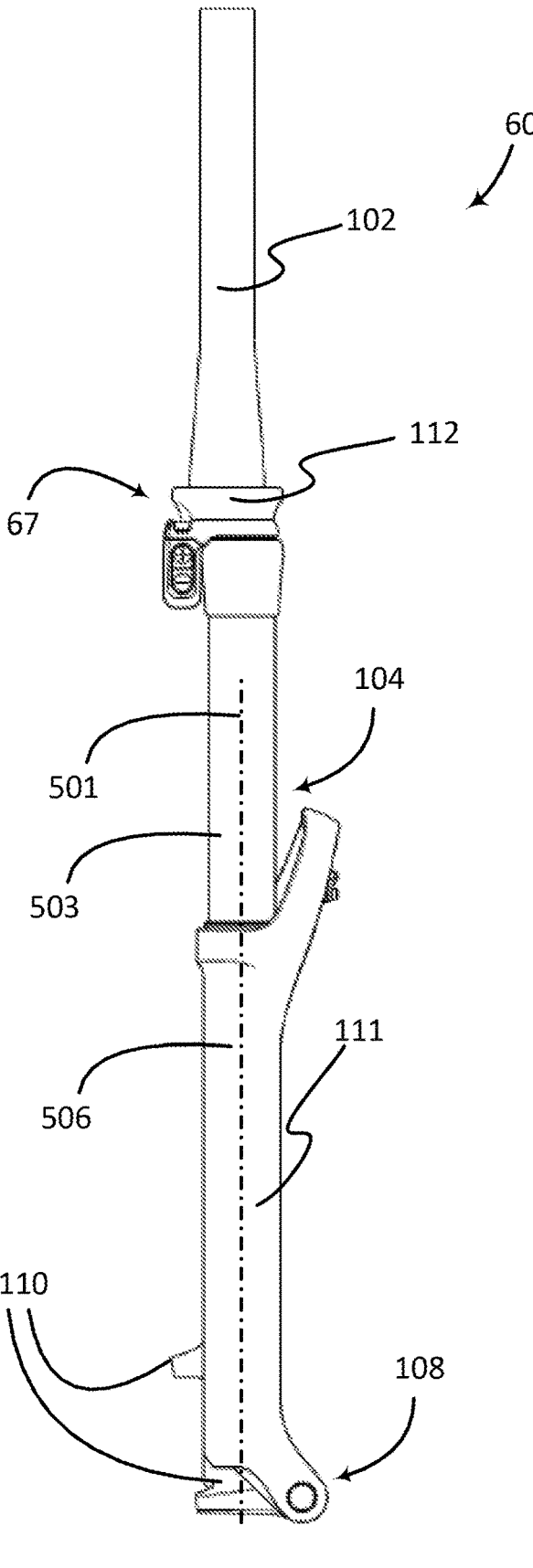
FIG. 4 shows a side view of the front suspension component of FIG. 2.
Figure 5:
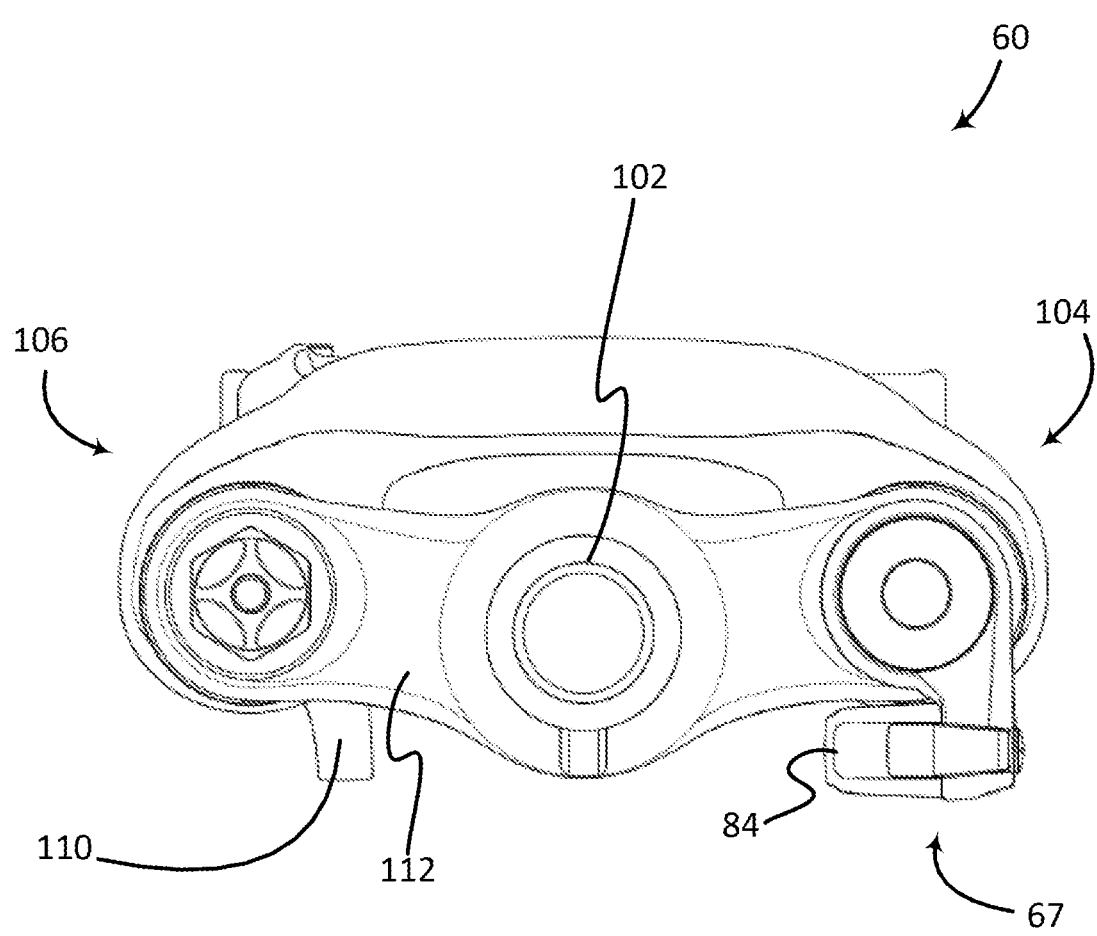
FIG. 5 shows a top view of the front suspension component of FIG. 2.

Now referring to FIG. 2, the front suspension element, or front fork 60, of FIG. 1 is shown in perspective view as isolated from the rest of the bicycle. FIGS. 3-5 show various other views of the front fork 60. The front fork 60 includes a steering tube 102 configured for attachment to a handlebar and the bicycle frame. The front fork 60 also includes at least one leg configured for rotatable attachment to a front wheel. In the displayed embodiment, the front fork 60 includes a first leg 104 and a second leg 106. The at least one leg includes a suspension system. The suspension system may include both a damping system, or damper, and a spring system. The two systems function together to form the suspension system. In the illustrated embodiment, the first leg 104 includes the damper and the second leg 106 includes the spring system. The first leg 104 and/or the second leg 106 allow contraction and/or expansion of length movements along an axis 501. The first leg 104 and/or the second leg 106 may be constructed of telescoping bars or tubes called stanchions. The first leg 104 and/or the second leg 106 may include an upper tube 503 or stanchion and a lower tube 506 or stanchion. In an embodiment, the lower tubes of both the first leg 104 and the second leg 106 are formed of a single piece lower tube construction, which includes a bridge configured to attach the two lower tubes.

The front fork 60 also may include one or more wheel attachment features 108, such as holes or dropouts configured for wheel hub attachment. The front fork 60 may also include brake attachment features 110, configured for attachment to wheel braking devices, such as disk brake calipers. For example, the brake attachment features may include raised protrusions and holes for fastener attachment to the calipers. In an embodiment, such as the illustrated embodiment, the wheel attachment features 108 and the brake features 108 are included on a front fork component that is connected to both legs. For example, the front fork component may be a single piece lower tube construction, or fork lower part 111. The fork lower part may include wheel attachment features 108 and/or the brake features 110. The single piece lower tube construction may be formed of a single material, such as aluminum or other materials. In an embodiment, the single piece lower tube construction is formed through an aluminum casting processes. Further machining or forming processes may be used to form specific features, shapes, and/or surfaces of the single piece lower tube.

The front fork may also include a piece forming the tops of one or both legs, such as a crown 112. The crown may be formed of a single piece that spans or forms the top of both the first leg 104 and the second leg 106. In an embodiment, the crown is formed of a single material, such as aluminum or other materials. In an embodiment, the crown is formed through an aluminum casting processes. Further machining or forming processes may be used to form specific features, shapes, and/or surfaces of the crown.

Figure 23:
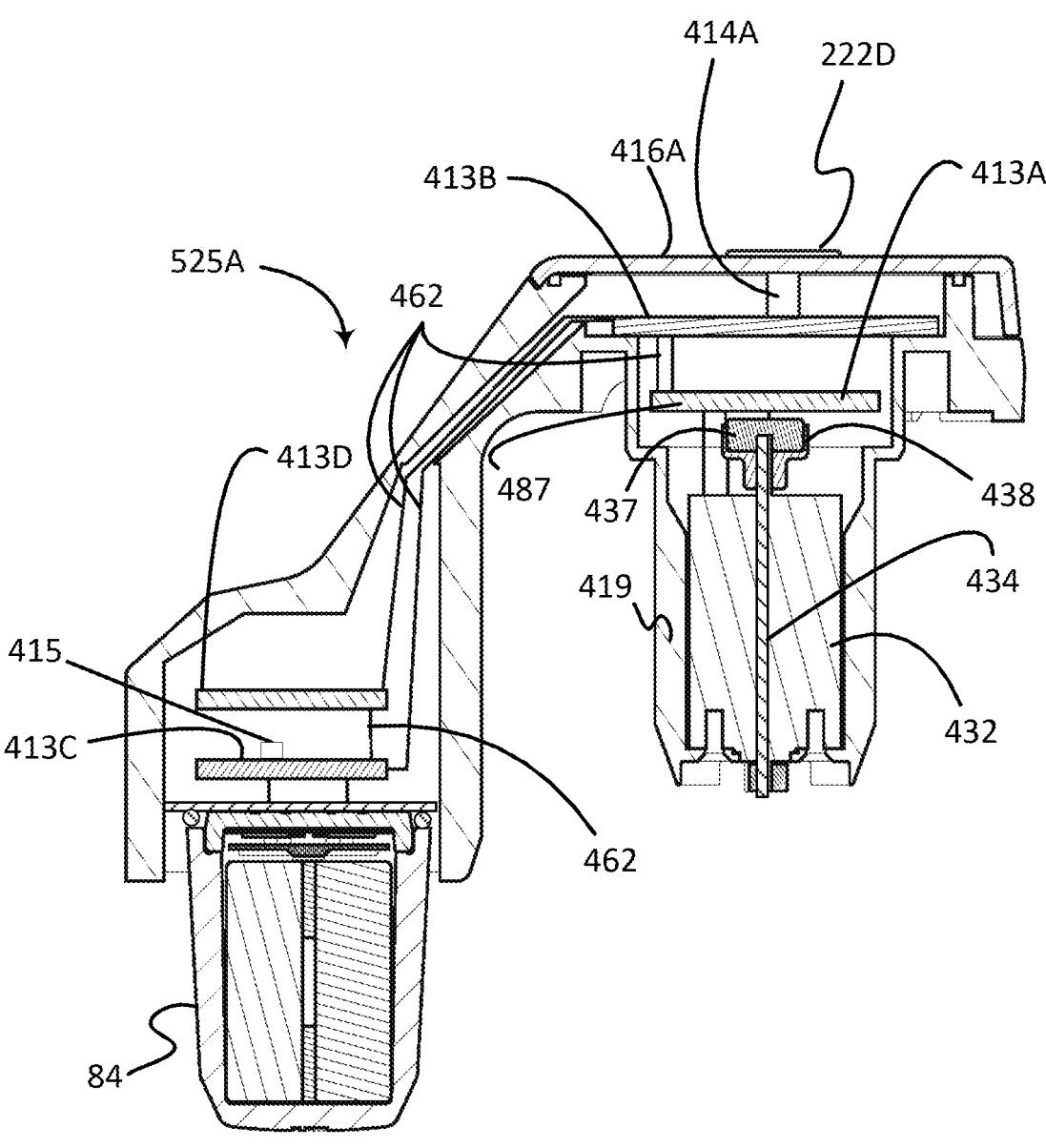
FIG. 23 shows a sectional view of the power adapter and some dry portions of the front suspension component of FIG. 20.

The front fork 60 also includes the suspension element control device 67. In an embodiment, the suspension element control device may be attached to, or at least partially integrated, with the crown 112. The suspension element control device 67 is configured to modify, adapt, or otherwise change a state of the suspension system. In the illustrated embodiment the suspension element control device is configured to change an operational state, or one or more operating characteristics, of the damper. The suspension element control device 67 includes a power supply 84, such as a removable battery as illustrated in FIG. 2, that is configured to provide power to control circuitry and/or other electric devices of the front fork, such as an electric motor or other electrical motive device, described further below. In an embodiment, the suspension element control device 67 may include one or more printed circuit boards ("PCB") including embedded circuitry and/or other devices for controlling the suspension element. For example, as is illustrated in FIG. 23, the suspension element control device 67 may include multiple PCBs 413A, 413B, 413C, 413D disposed within a housing of the device.

Figure 6A:
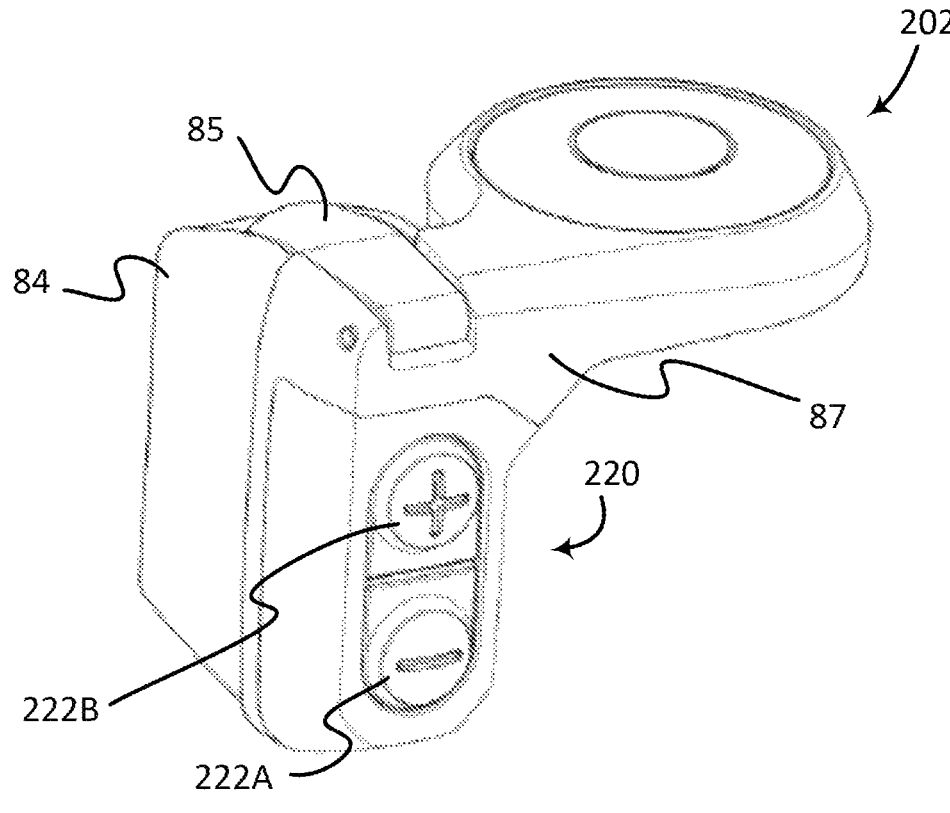
FIGS. 6A-6B show a power adapter of the front suspension component of FIG. 2.
Figure 6B:
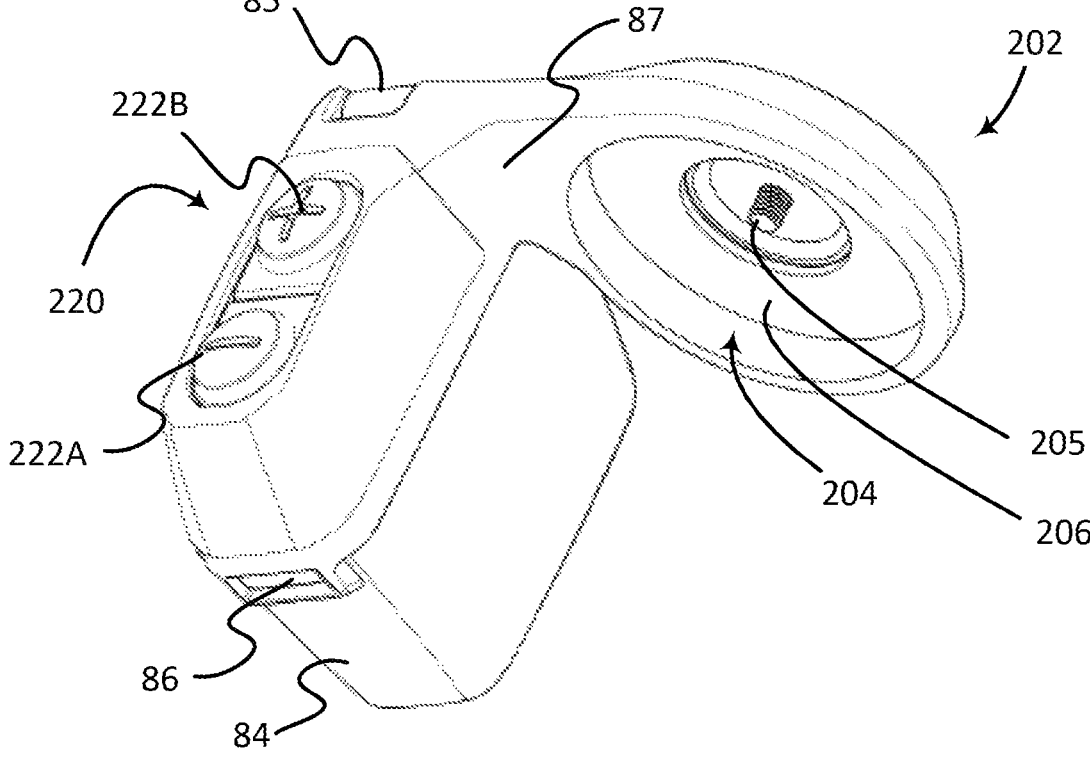

The suspension element control device 67 may include an externally mounted component, for example a power adapter 202. The power adapter 202, shown isolated in FIGS. 6A and 6B includes the power supply 84. The power adapter may be attached to a leg or crown of a front fork suspension component. As such, the power adapter 202 may include leg attachment features 204. The leg attachment features 204 are configured for attachment to a leg or crown of the front fork 60. In the illustrated embodiment the power supply 84 is a removable power supply and is held to a housing 87 of the power adapter 202 by an attachment mechanism, or latch 85 and hook 86 interface. In this embodiment, the power supply 84 is removed through rotation of the latch 85 and pivoting of the power supply 84 out of the hook attachment 86.

The power adapter 202 may also include a user interface 220 for the suspension element control device. For example, the power adapter 202 may include one or more buttons 222A, 222B, such as manually operated buttons, configured to cause the suspension element control device to change a characteristic of the suspension element control device when actuated, or pressed. For example, a suspension element may be adjustable through a plurality of damping settings ranging from complete lockout that prohibits movement of the suspension element, to a low damping state that provides a low level of suspension element movement resistance. In this example, the one or more buttons may include two buttons 222A, 222B which may cause the suspension element control device 67 to adjust between damping states of the suspension element. Each button may cause an adjustment to a state of more or less damping, respectively, as is described further herein. For example, a first button 222A may cause adjustment to a next lower damping state and a second button may cause an adjustment to a next higher damping state.

The leg attachment features 204 include electrically communicative contacts 205 to provide for the communication of power and/or command signals to other electrical components of the suspension element control device, such as motor controllers, sensors, and/or other electrical components. The leg attachment features 204 may also include an interfacing portion 206 configured to interface with a corollary attachment portion of the crown 112 to provide a secure, aligned, stable, and/or sealed fit between the power adapter 202 and the crown 112. The leg attachment features 204 may also include a securing mechanism configured to secure the power adapter 202 to the suspension element, or specifically to the crown 112. For example, the communicative contacts 205 may be formed with threading configured to fit with corresponding threading in the crown attachment portion or other portion of the suspension element. Other attachment techniques may also be used.

Figure 20:
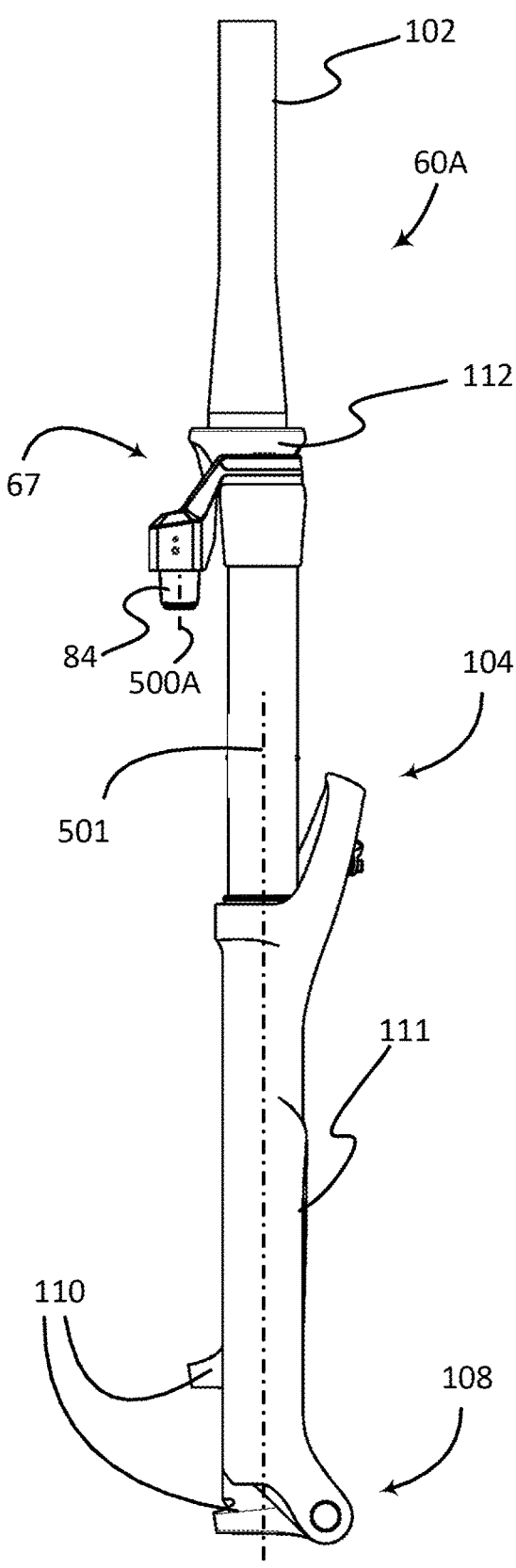
FIG. 20 shows a side view of an alternate embodiment for a front suspension component.

FIG. 20 illustrates another embodiment of a front fork 60A including a suspension element control device 67A. In this embodiment, the power supply is attached or mounted in a different orientation relative to the crown 112. As shown, a power adapter 202A may be configured to orient a power supply to power adapter interface 99A in downward and/or vertically shielded orientation. This orientation may provide protection from vertically oriented or approaching hazards and/or provide further aversion to environmental fluid ingress to the front fork system.

In this embodiment the power adapter 202A is configured such that the power supply is mounted with a power supply to the rear of the crown 112 with a power supply to power adapter interface 99A oriented along a vertical power supply attachment axis 500A. In an embodiment, the power supply attachment axis 500A is parallel to an axis of movement 501 of the first leg 104. Other configurations and orientations of the power adapter interface are also possible.

Figure 21:
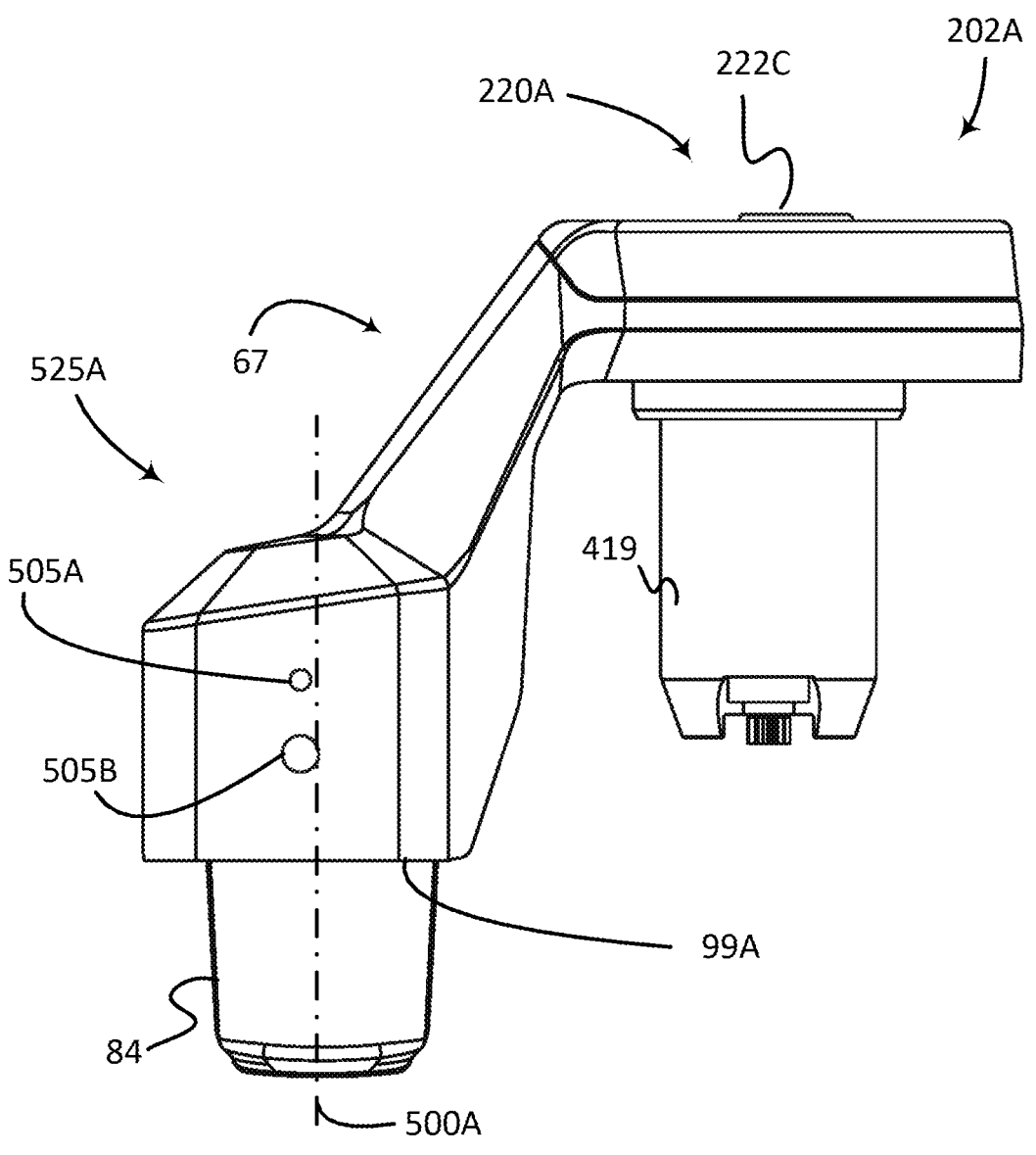
FIGS. 21-22 show various views of a power adapter and some dry portions of the front suspension component of FIG. 20.
Figure 22:
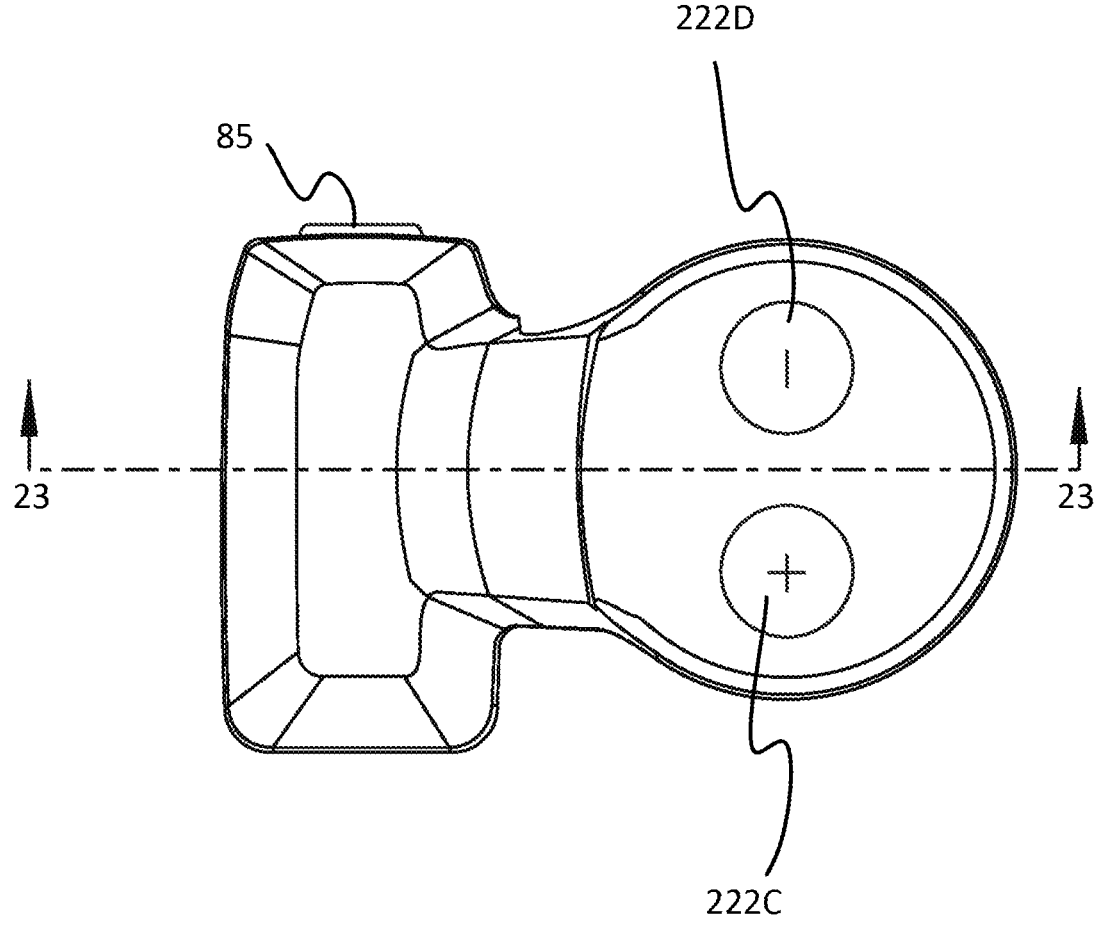

Isolated views of the power adapter 202A of the front fork 60A of FIG. 20 are illustrated in FIGS. 21-22, with a cross sectional view of the power adapter 202A as indicated in FIG. 22 illustrated in FIG. 23. The power adapter 202A includes a user interface 220A with buttons 222C, 222D and LEDs 505A, 505B, and a housing 419 for electrical components of the control device 67. The housing 419 may form at least a portion of the internal dry portion as described herein.

The housing 419 may include similar elements as the housing 410 previously described, but in this embodiment is formed as a single piece with at least part of a power supply attachment portion 525A. For example, the housing 419 may be formed as one piece through a plastic molding process.

This embodiment includes multiple PCBs 413A, 413B, 413C, 413D as part of the suspension element control device. Each of the PCBs may be configured with specific circuitry and/or instructions of performing different activities relating to the control of the suspension device.

A PCB 413A may be configured with circuitry and/or instructions to provide motor controlling activities and thus include a motor controller 487. Another PCB 413B may be configured to interpret and communicate actuation signals from buttons 222D, 222C of the user interface. For example, the buttons 222D, 222C may communicate with the PCB 413B through an electrical contact device 414A and the PCB 413B may then communicate an action signal with other PCBs 413C, 413D, and/or 413A. For example, the action signal may be a control signal configured to cause operation of the motor 432.

Another PCB 413D may be configured as a central processing component including circuitry and/or instructions to control the other portions of the suspension element control device 67. For example, the PCB 413D may include a communication interface, such as a wireless transmitter and/or receiver configured to receive control signals, and/or the PCB 413D may provide instructions to other PCBs 413A, 413B, and/or 413D to enact the intended controls of the suspension control device 67. In such an embodiment, this PCB 413D may be a master or primary PCB and the other PCBs 413A, 413B, and/or 413C may be slave or secondary PCBs.

Another PCB 413C may be configured with circuitry and/or instructions to interface with the power supply 84 to which the PCB 413C is communicatively coupled. This PCB 413C may be configured to control the power out of or into the battery, and/or may be configured with appropriate power sensors 415 to provide an indication of an amount of power contained by the power source 84. Communicative conductors 462 may be used to communicate power and/or data between two or more of the PCBs 413A, 413B, 413C, 413D.

Other configurations of more or fewer PCBs may be used. Also, the activities related to the PCBs as are described herein may be combined using circuitry and/or instructions of more than a single PCB.

Figure 7:
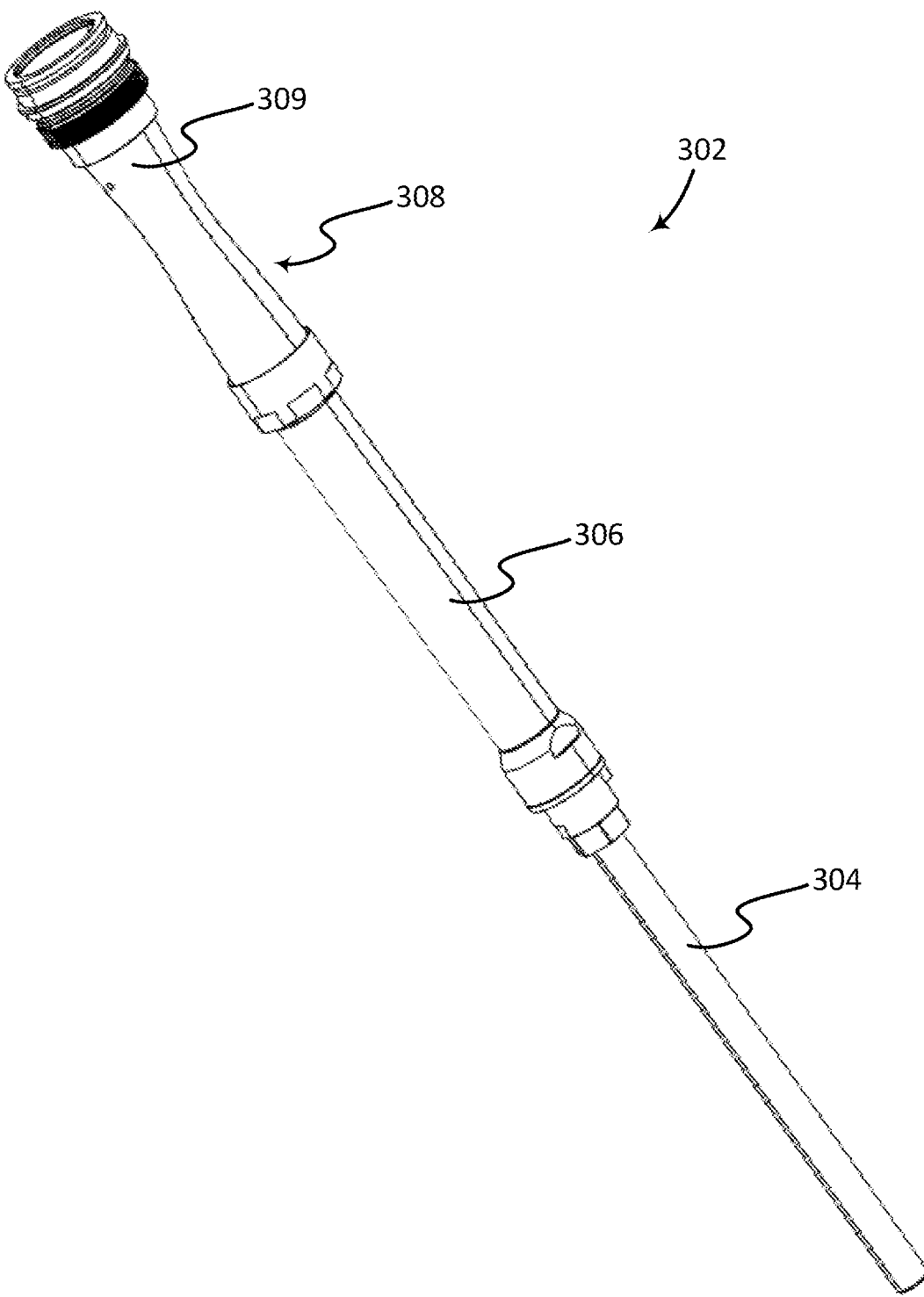
FIG. 7 shows a perspective view of a damper device of the front suspension component of FIG. 2.

FIG. 7 illustrates a damper device 302 for a suspension element such as the front fork 60. The damper device 302 is a mechanical device configured to dissipate energy input to the suspension component due to impact or impulse forces being applied to the suspension component. The damper device 302 may include a first part 304, such as a shaft or leg. The first part 304 moves relative to a second part 306. The first part 304 or the second part 306 may provide a damping mechanism. In the displayed embodiment, the second part 306 provides the damping mechanism to dissipate the energy causing the first part 304 to move relative to the second part 306. For example, a hydraulic damping mechanism is included in the second part 306. Other damping mechanisms may be used, such as mechanical, pneumatic, or combinations of mechanical, pneumatic, or hydraulic damping mechanisms.

Figure 8:
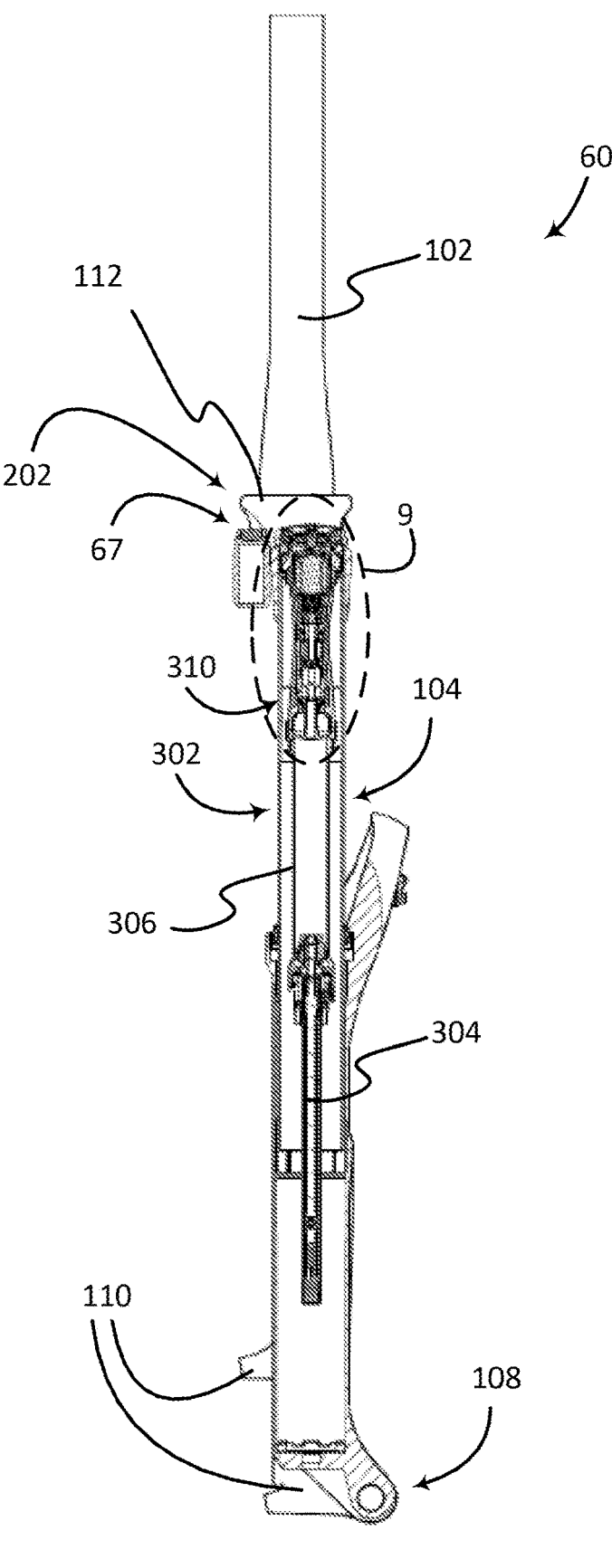
FIG. 8 shows a sectional view of the front suspension component of FIG. 2.
Figure 9:
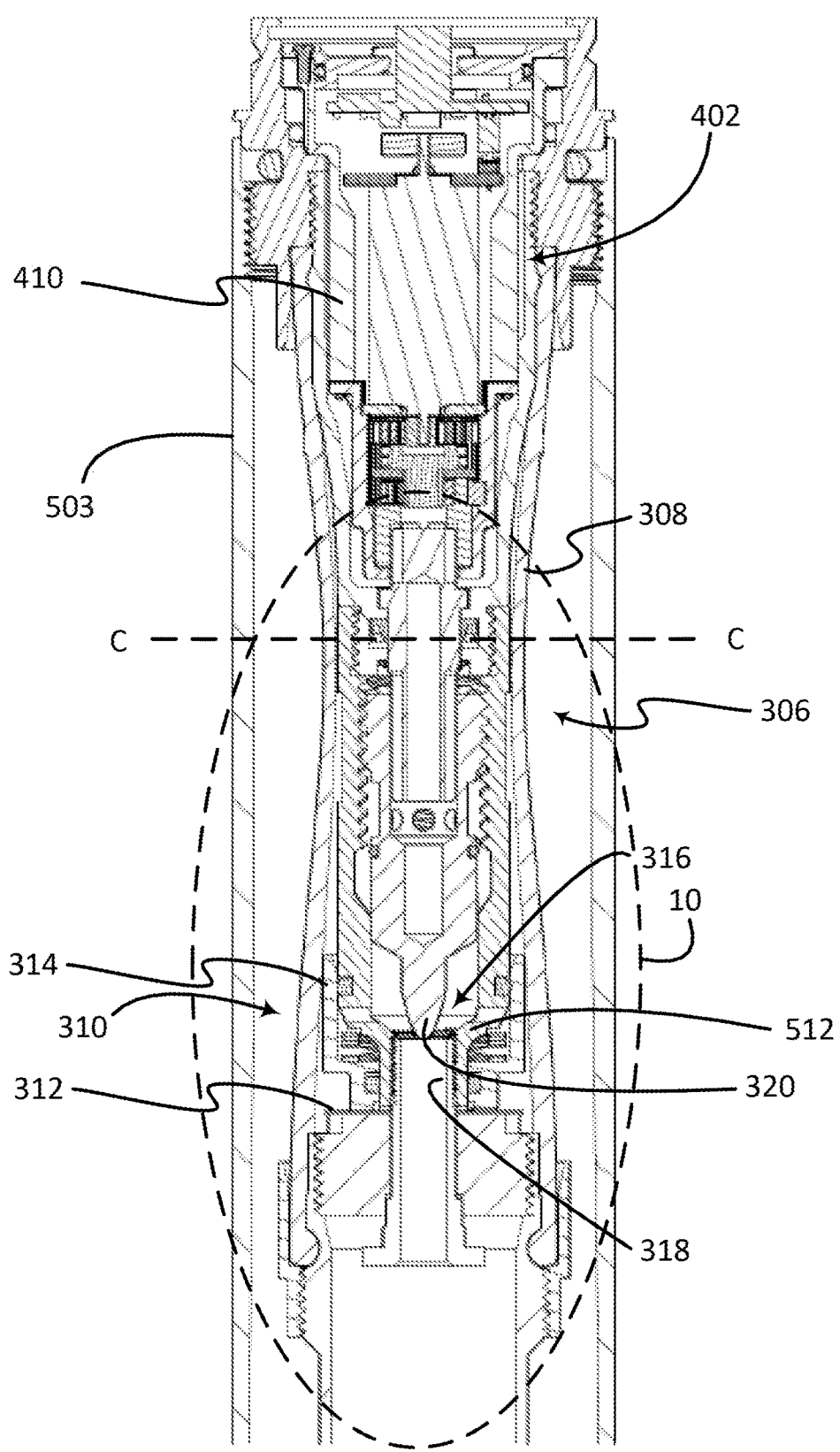
FIG. 9 shows an enlarged view of the sectional view of the region indicated in FIG. 8.

The damper device 302 may be disposed in one of the legs 106, 104 of the suspension element, for example the first leg 104 may be configured to include the damper device to provide damping for the suspension element, as is illustrated in FIGS. 8 and 9. For example, the first part 304 of the damper device 302 may be secured and/or affixed to a first part of the suspension element, such as a lower leg, and the second part 306 of the damper device 302 may be secured to a second part of the suspension element, such as an upper leg. The movement of the lower leg with respect to the upper leg due to external inputs on the suspension element is restricted by the damper device. In an embodiment, the lower leg is formed by the fork lower part 111, and the second part 306 is attached to, or otherwise operably in contact with, the fork lower part 111.

The hydraulic damping mechanism in the second part 306 may include an accumulation device 308. The accumulation device 308 is configured to hold a variable amount of fluid that is moved during operation of the damping mechanism. In the illustrated embodiment the first part 304 is configured to move fluid through a restrictive structure 310 in the second part 306, and the accumulation device 308 includes a flexible member 309 that is configured to expand or contract depending on the amount of fluid displaced by the movement of the first part 304. Such an expandable accumulation device allows for the transition of fluid from one side of the restrictive structure 310 to the other without the inclusion of significant dead or open space in the fluid damping system. As such the volume of fluid used in the damping mechanism is maintained at a constant and there is minimal inclusion of air into the fluid which maintains the flow characteristics of the fluid at a relatively constant level.

FIG. 9 provides a close-up view of the area 9 of FIG. 8. In this embodiment, the restrictive structure includes a low flow restriction that includes a shim stack 312 configured to resist the flow of fluid. For example, the shim stack 312 is configured to deform when fluid pressure builds on a side of the stack to open flow paths in the corresponding direction. The degree and/or amount of shim deformation can be variable and/or controllable. For example, an adjustment member 314 may be configured to interact with the shim stack 312 to adjust the degree and/or amount of shim deformation. In this embodiment, the adjustment member 314 may make varying degrees of contact with, and/or cause varying degrees of contact force to, the shim stack 312 to control the available shim deformation.

The restrictive structure also includes a high volume flow restriction, such as a nozzle 316. The nozzle may be formed as a part of the flow casing 512. The nozzle 316 includes an orifice 318 and an obstructing member 320, providing a needle 321. The needle 321 may be dimensioned to fit within the orifice 318 that may be formed by a portion of the flow casing. The orifice portion may be formed with and/or a unitary structure of the flow casing, or a separable part from other portions of the flow casing. The needle 321 may also have a varying width, for example cone shaped so as to increase in width along an actuation axis, so as to create a variable flow area through the nozzle depending on the needle 320 position relative to the orifice 318.

Figure 10:
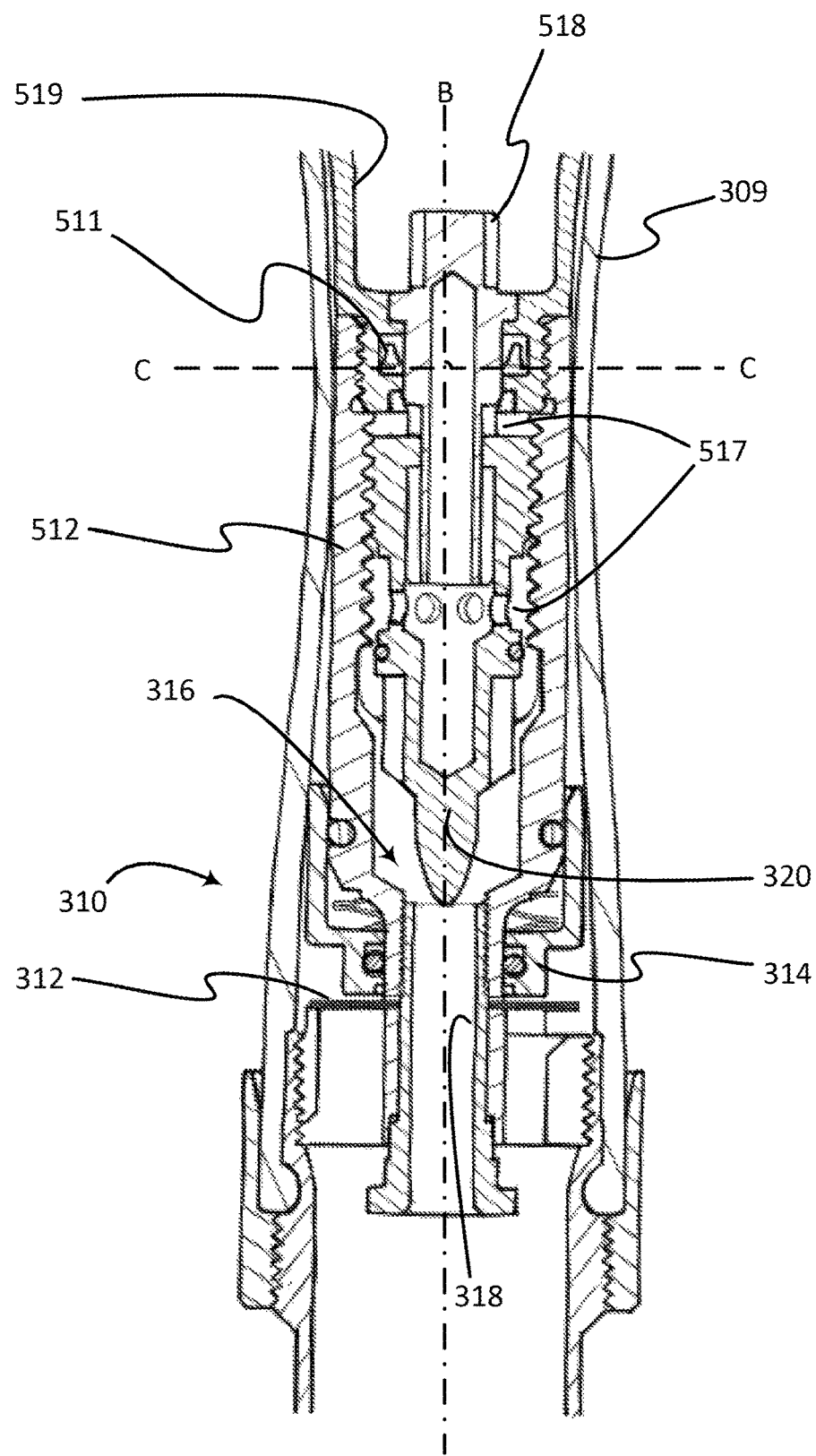
FIGS. 10-12 shows an enlarged view of the sectional view of the region indicated in FIG. 9.
Figure 11:
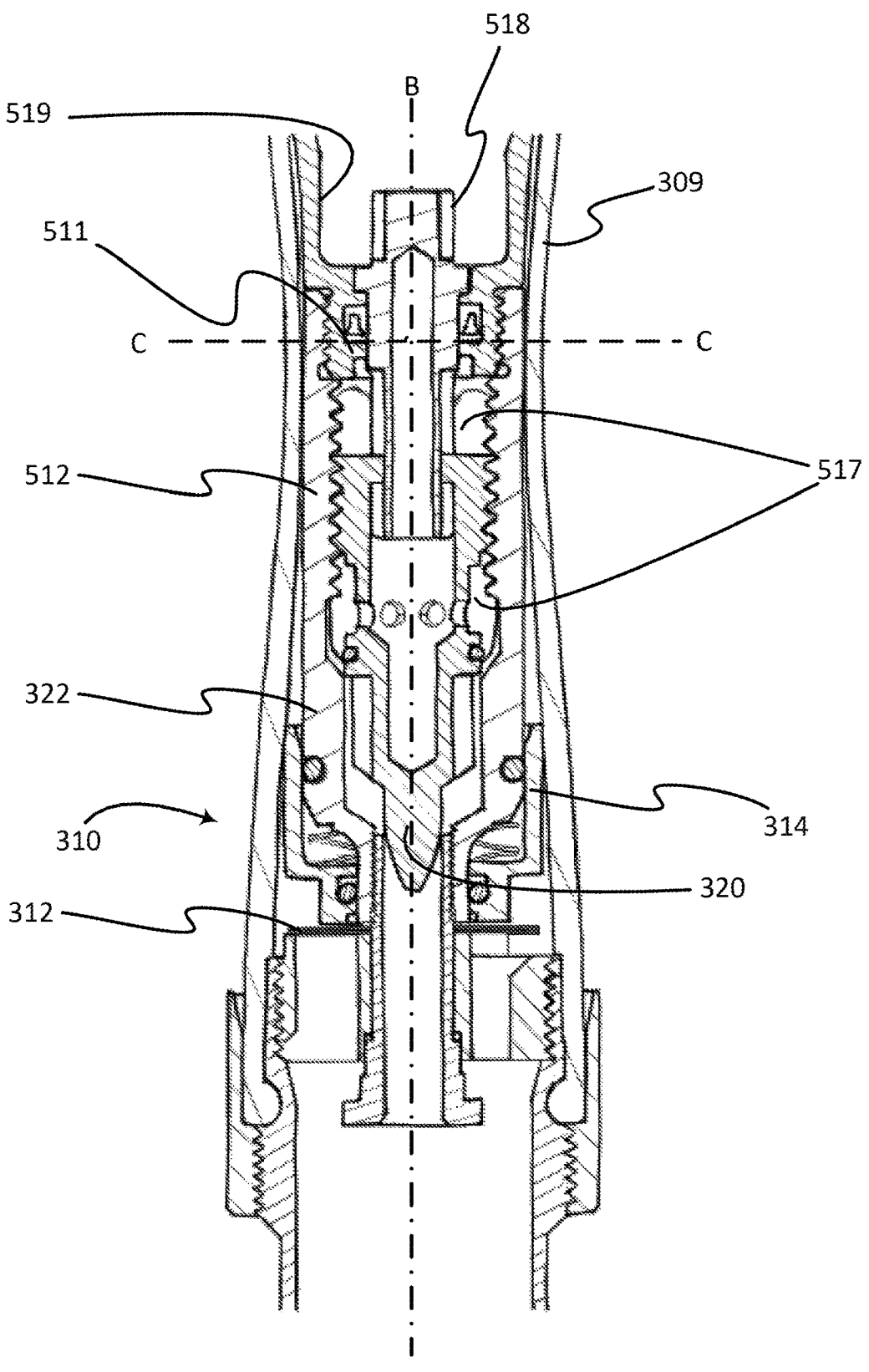
Figure 12:
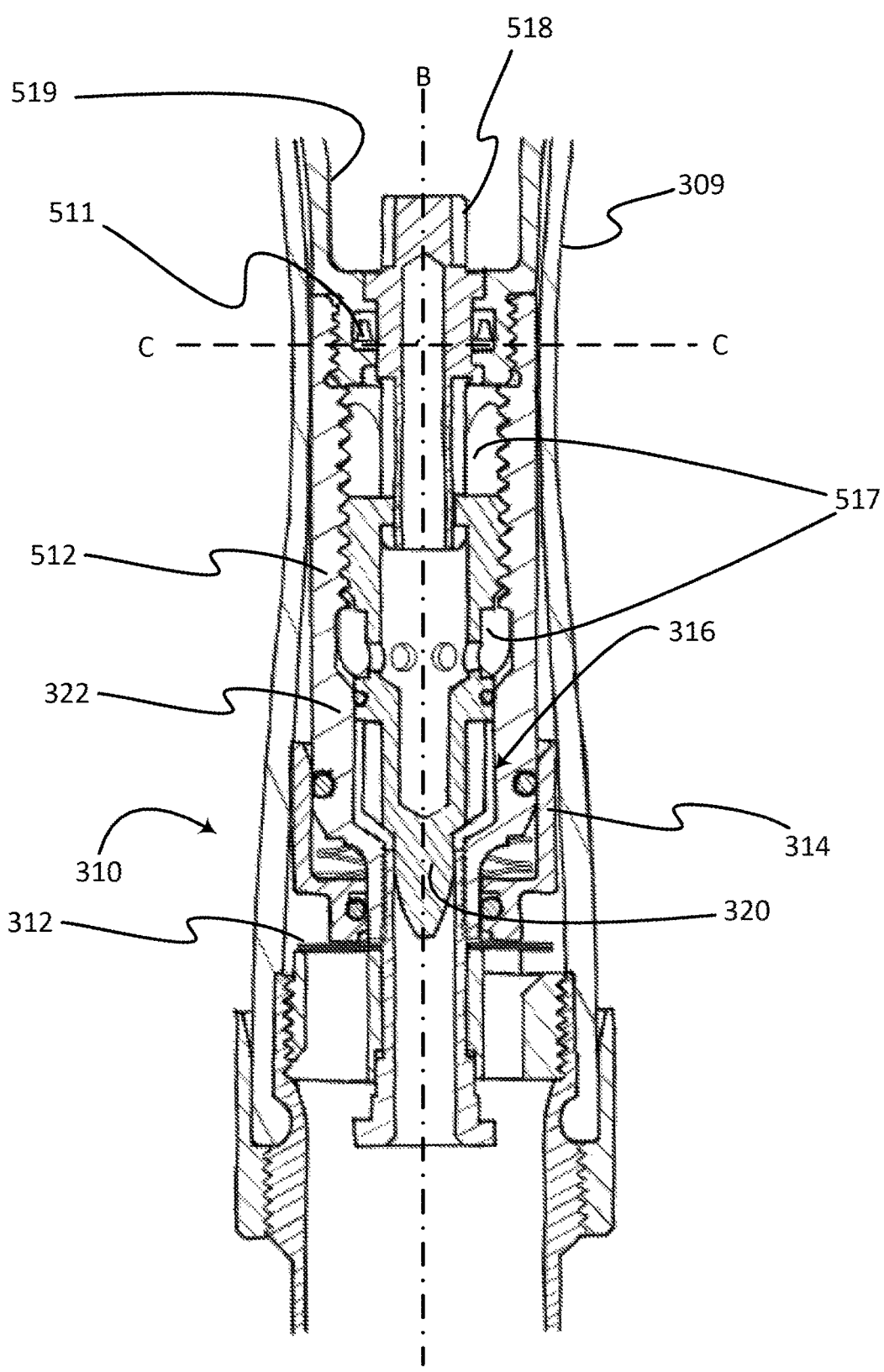

The restrictive structure 310 may be variable or adjustable. For example, as can be seen in FIGS. 10-12 the restrictive structure 310 may be operable to cause a multiple amounts or degrees of damping. In an embodiment, the suspension element control device 67 may be configured to provide at least three damping states. The damping states may be enacted by the positioning of the obstructing member 320.

FIG. 10 illustrates the damper in an open state. The shim stack 312 is not contacted by the adjustment member 314 to allow full flexibility or deformation of the shim stack 312 and the least restrictive fluid flow therethrough, and the needle 320 is removed from the orifice 318 providing minimal restriction of flow through the nozzle 316.

FIG. 11 illustrates the damper in a restricted state. The shim stack 312 is not contacted by the adjustment member 314 to allow full flexibility or deformation of the shim stack 312 and the least restrictive fluid flow therethrough. In this state, however, the needle 320 is inserted into the orifice 318 providing a restriction of flow through the nozzle 316. As shown, the needle 320 is fully blocking the orifice 318 so as to completely block high volume fluid flow through the restrictive structure 310. The needle 320, however, may also be in varying degrees of engagement with the orifice 318, providing a plurality of different flow areas through the nozzle 316 depending on the needle's position along a movement axis B of the obstructing member.

FIG. 12 illustrates the damper in a closed state. The obstructing member makes contact with a structure 322 of a flow casing 512 that causes the adjustment member to move towards and fully engage the shim stack 312, changing the deformation characteristics of the shim stack 312 and resulting in more flow restriction for fluid moving across the shim stack 312. In this state, the needle 320 is also inserted into the orifice 318 providing a restriction, or elimination, of flow through the nozzle 316. As shown, the needle 320 is fully blocking the orifice 318 so as to completely block high volume fluid flow through the restrictive structure 310.

As is described above, the obstructing member is moved along the axis B to change between damping states to modify the damping characteristics of the damper. The obstructing member may be moved by any technique. In an embodiment the obstructing member is moved using a combination of electric and mechanical parts. For example an electric motor and gear assembly may be housed in a part of the second portion of the damper. In this embodiment, the second portion of the damper may include a wet portion 517, or a portion including an amount of hydraulic fluid for a hydraulic damping mechanism, and a dry portion 519, or a portion that does not include hydraulic fluid. There may be a seal 511 between the dry portion and the wet portion to prevent hydraulic fluid from entering the dry portion. The dry portion is configured to house electrical components of the suspension element control device. In an embodiment, the dry portion 519 may be disposed in an portion of the damper that is radially inward of the wet portion. For example a part of a chamber of the wet portion may be defined by the flexible member 309, and the dry portion may be disposed radially inward of the chamber. the flexible member 309 may be configured to provide the chamber with a variable volume. At least part of the dry portion may be disposed radially inward of the variable volume chamber of the damper.

Figure 13:
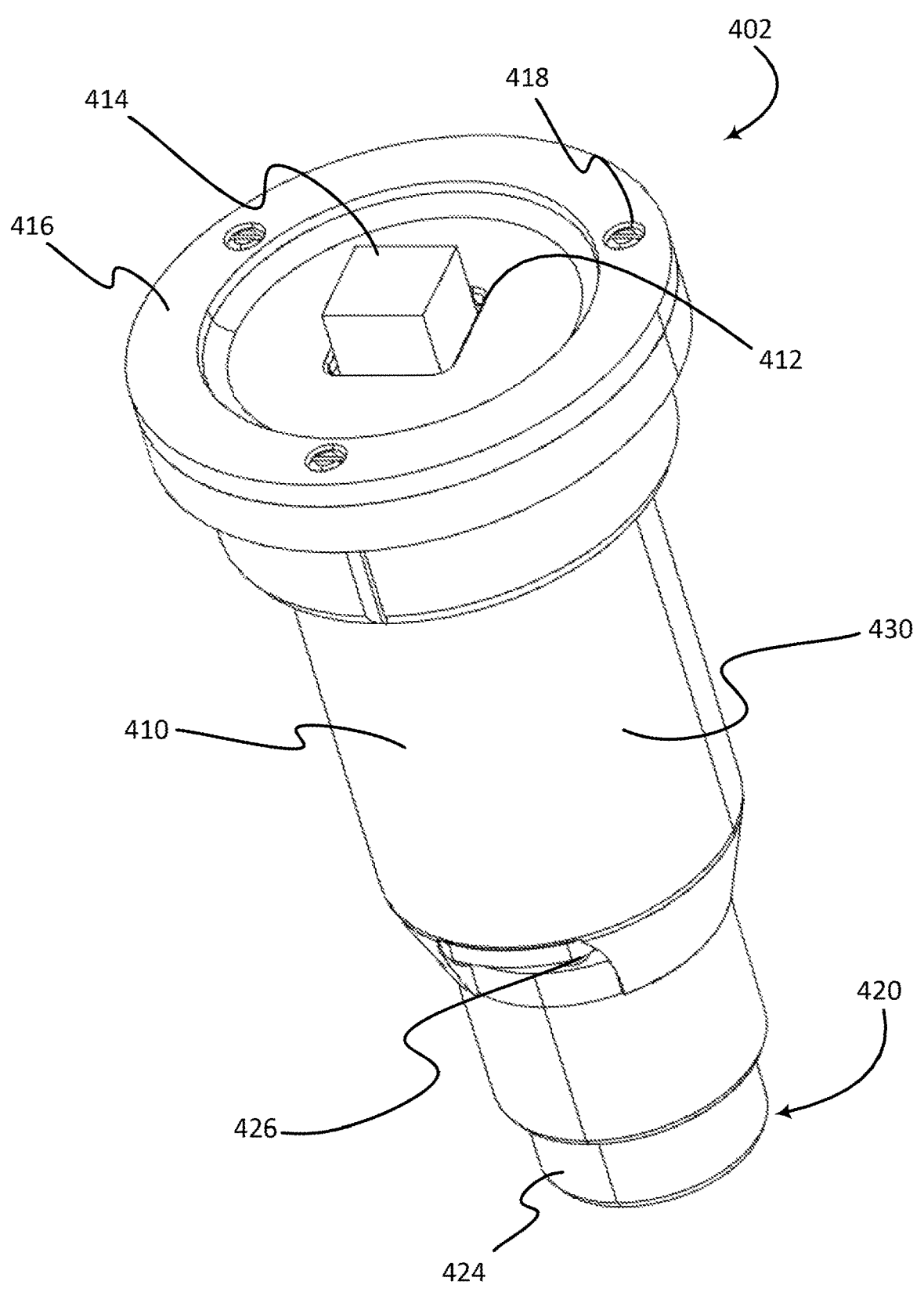
FIG. 13 shows a perspective view of an actuation device of the damper device of FIG. 7.
Figure 14:
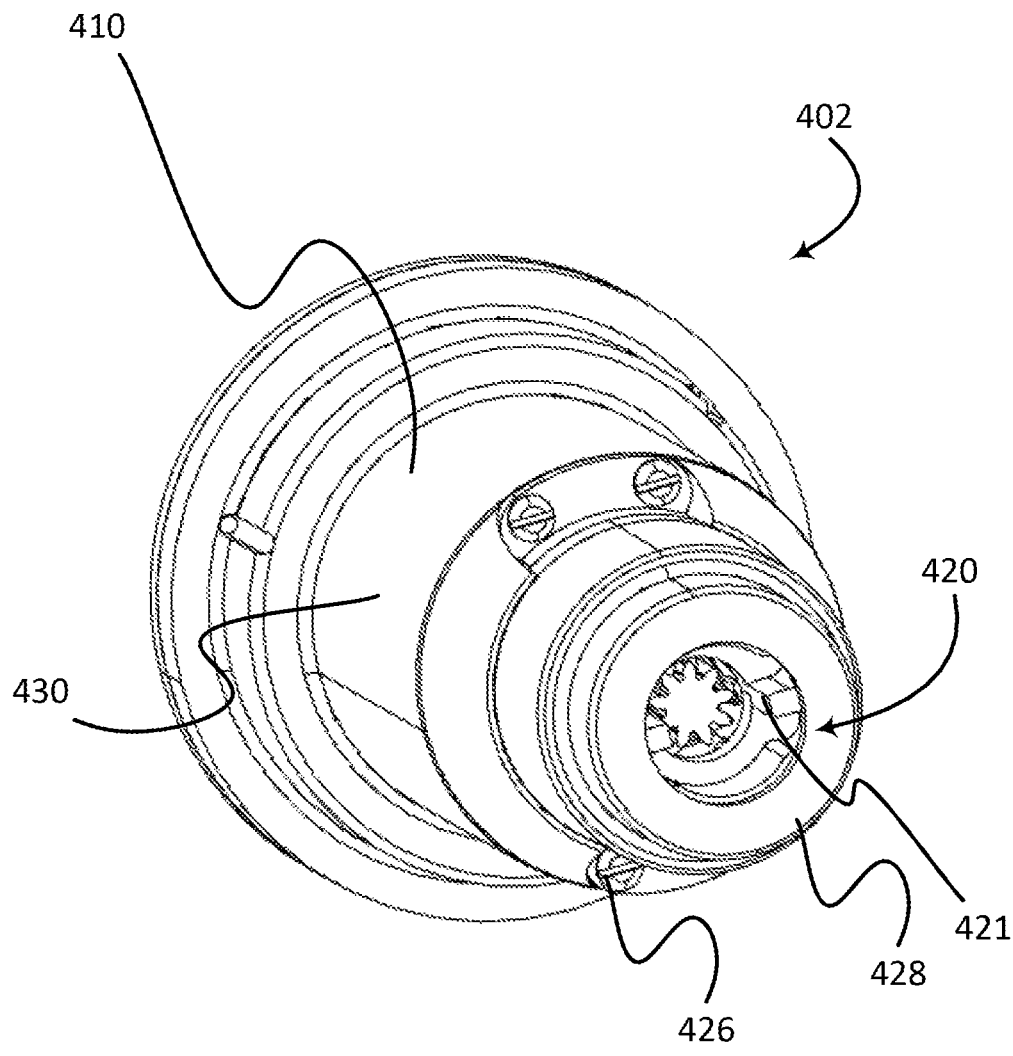
FIG. 14 shows a perspective view of an actuation device of the damper device of FIG. 7 from an alternate perspective to that shown in FIG. 13.
Figure 15A:
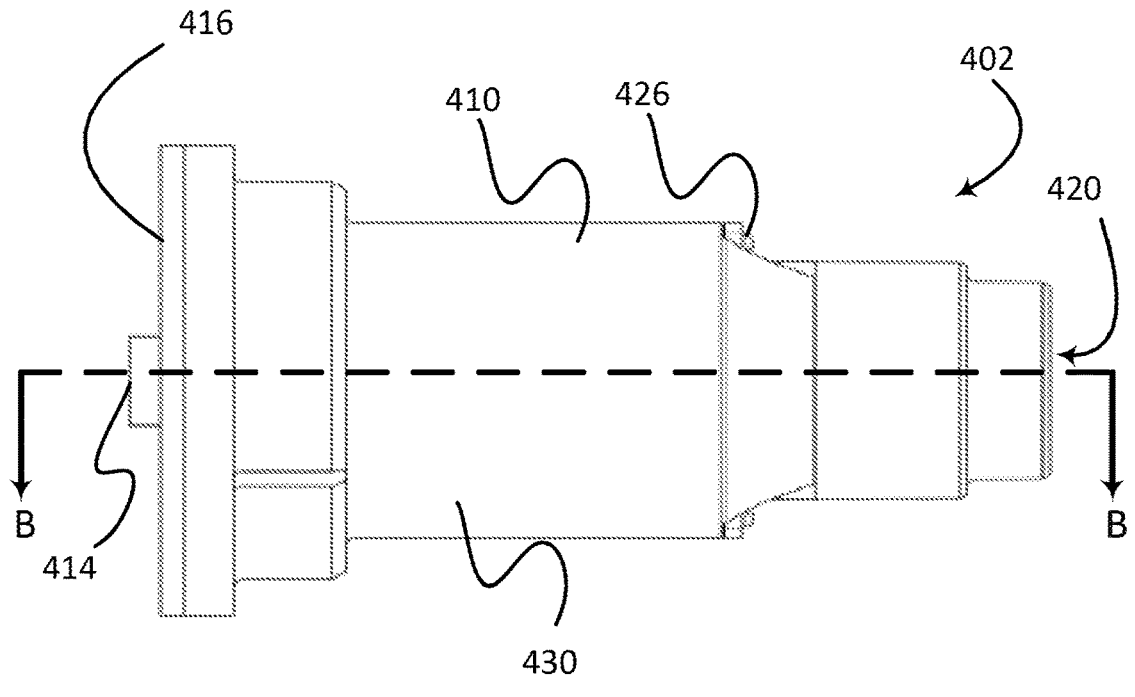
FIG. 15A shows a side view of the actuation device of FIG. 13.
Figure 15B:
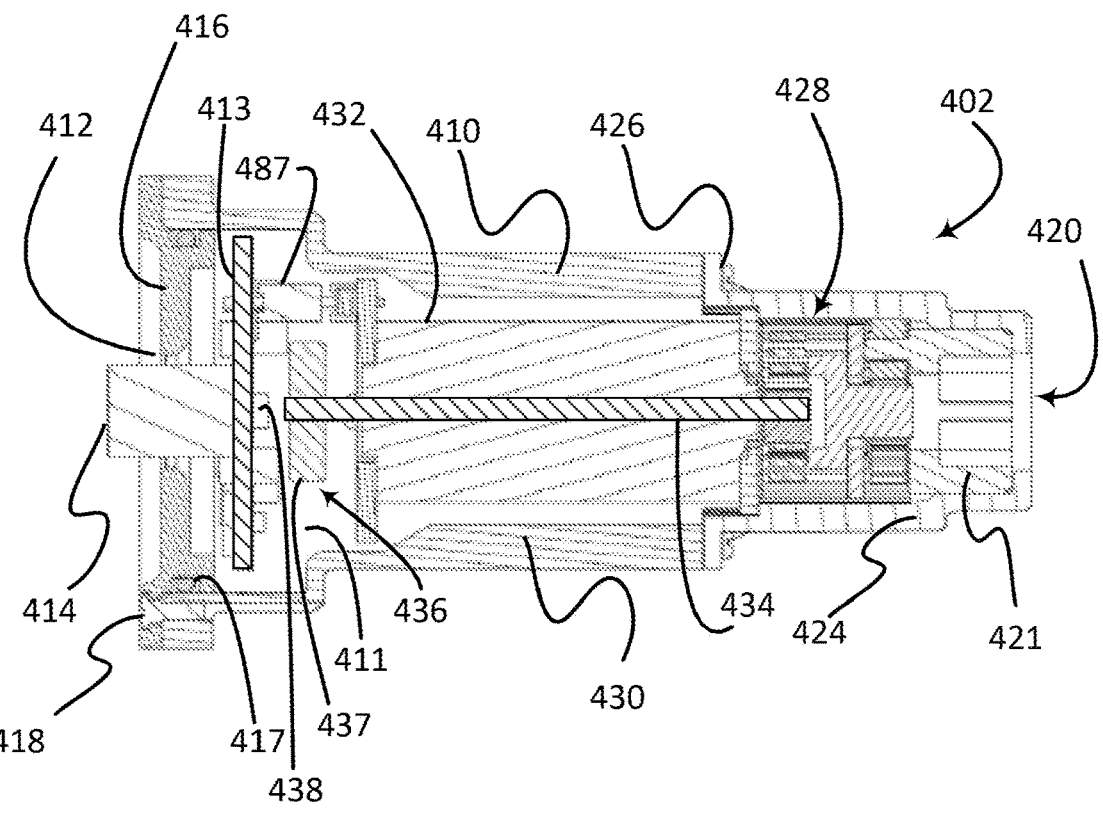
FIG. 15B shows a cross sectional view of the actuation device as indicated in FIG. 15A.

The dry portion includes, or is configured to include, an actuation device 402. FIGS. 13-16 illustrate various views of an actuation device 402. The actuation device 402 is configured to cause the damper to change a characteristic. For example, the actuation device 402 may be configured to cause the obstructing member to move. Electrical components of the actuation device may be disposed within a housing 410, as is shown in FIG. 13. The housing may have an opening 412 through which an electrical contact device 414 protrudes. The electrical contact device 414 is configured to communicate power and/or data with power adapter 202. For example, the electrically communicative contacts 205 are configured to communicate power and/or data to the electrical contact device 414. In an embodiment, the electrically communicative contacts 205 are configured to communicate both power and data to the electrical contact device 414. In an embodiment, the electrically communicative contacts 205 are configured to contact the electrical contact device 414.

In an embodiment, for example as illustrated in FIG. 9, the housing 410 may be dimensioned to fit within a space of the damper 302. For example, the damper 302 may have formed therein a chamber sized and shaped to accept the housing 410.

The housing 410 may include an enclosing member 416. The enclosing member 416 may be a cap disposed at a longitudinal end of the housing. The opening 412 may be formed in the enclosing member 416. The enclosing member may be removably attached to one or more other portions of the housing 410. For example, the enclosing member 416 may be attached to one or more other portions of the housing 410 by removable fasteners 418, such as screws and/or bolts. Other permanent or removable attachment techniques, such as threading, or snap fit mechanisms, may be used in place of, or in addition to, the removable fasteners 418. The enclosing member 416 may be removable to provide access to internal components of the housing 410 for service. For example, the housing may include a motor 432 disposed therein, and the removal of the enclosing member may facilitate service and/or replacement of the motor 432. In addition, the enclosing member 416 may include a sealing member 417, such as an O-ring or gasket. The sealing member provides a seal to protect an internal space 411, and/or components disposed therein, from water or other environmental contaminants.

The actuation device may include an output portion 420. The output portion 420 provides a motive interactive portion the actuation device outside the housing 410. For example, the output portion 420 may be configured to couple with an actuating member 510. The actuating member 510 may join with a rotational coupling 421 between the actuation device and the obstructing member 320.

The output portion 420 may include an output housing 424. The output housing 424 may be removably attached to one or more other portions of the housing 410. For example, the output housing 424 may be attached to one or more other portions of the housing 410 by removable fasteners 426, such as screws and/or bolts. Other attachment techniques, such as threading, or snap fit mechanisms, may be used in place of, or in addition to, the removable fasteners 426. In an embodiment, the output housing 424 is configured to house a gearbox, or gear train 428, or other rotational motion translation mechanism operable to change a rotational speed of an input to the rotational motion translation mechanism to the output. The gear train 428 includes two or more gears 429 for transforming the rotational velocity of an input into a different rotational velocity of an output. In an embodiment, the gear train 428 includes multiple planetary gear stages to transform the rotational velocity of the input into the different rotational velocity.

In an embodiment, the housing 410 of the actuation device 402 includes at least three portions. An output housing 424, an enclosing member 416, and a third housing portion 430. The third housing portion 430 may be an electronic housing configured to house an electric motor and/or other electric or electronic components. This multiple part configuration may provide additional benefits during assembly or manufacturing as each of the parts, the output housing 424 with the gear train 428 and the electronic housing with the electric components, may be created separately, then assembled along with the enclosing member 416 to provide the actuation device.

Figure 16:
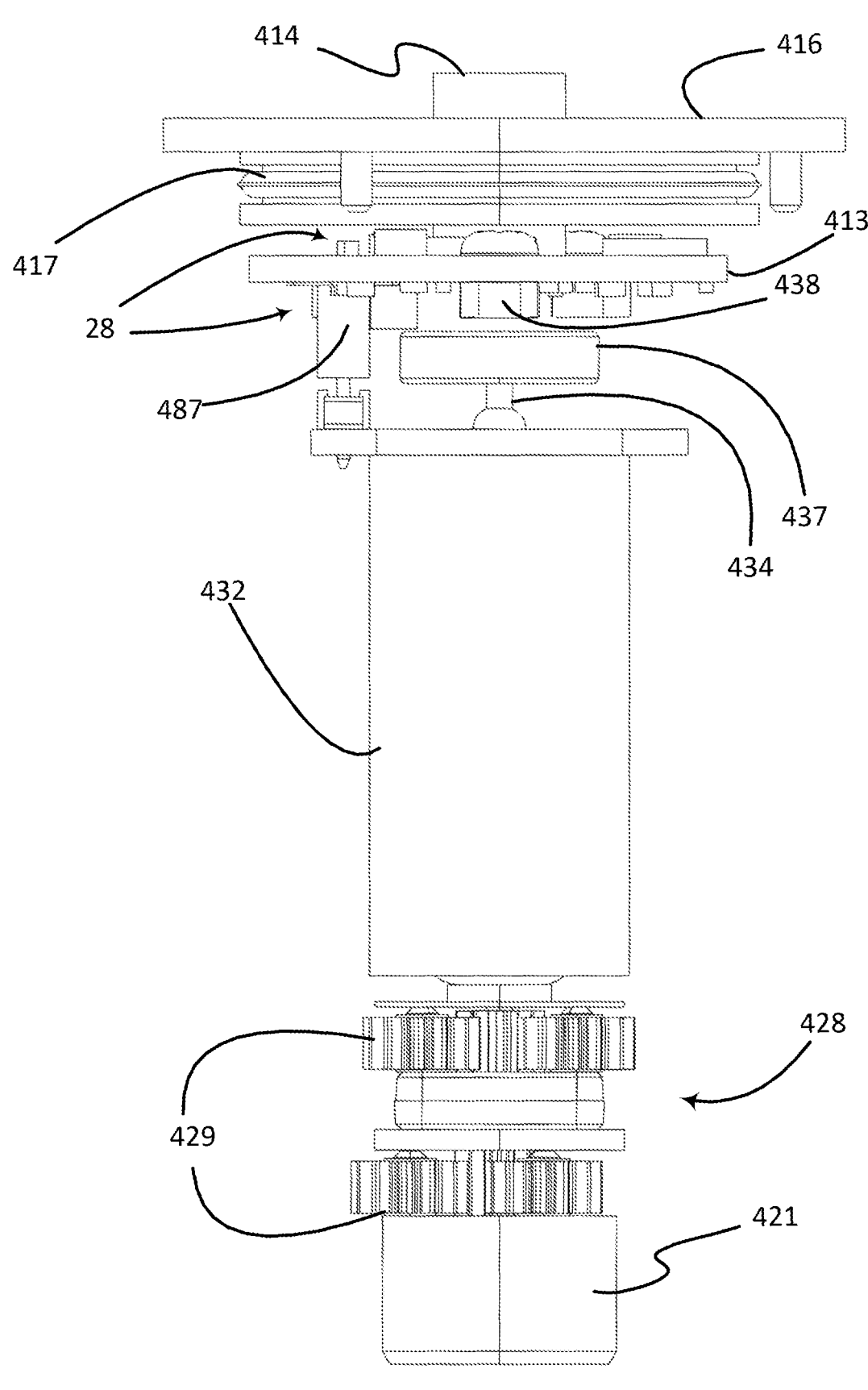
FIG. 16 shows the actuation device with a housing removed.

The electronic components may include different components. For example, the electronic components may include the motor 432, such as an electric motor and a printed circuit board ("PCB") assembly providing a substrate 413 with attached circuitry 28, such as a processor 20 and/or a motor controller and/or power processing or signal processing device, for the motor 432. The PCB assembly may also include electrically communicative attachment to the electrical contact device 414 such that power and/or data may be communicated through the electrical contact device 414 to other circuitry of the PCB, such as the processor 20. The PCB may also include power and/or data conductive connection device 487 to provide power and/or data to the motor 432. The conductive connection device may be a motor controller providing command signals to the motor 432. The PCB may include additional circuitry. Further, the circuitry may exist on one or both sides of the PCB substrate 413. For example, as illustrated in FIG. 16, circuitry 28 is disposed on both sides of the substrate 413.

The motor 432 may include a shaft 434 that rotates as driven by the motor motive mechanism, such the electromagnetic field of an electric motor. The shaft 434 is operatively coupled to the gear train 428. In an embodiment, the shaft 434 is operatively coupled to the gear train 428 at an end of the shaft 434. An other end of the shaft 434 may have a rotation encoding device 436 affixed in part or in whole. The rotation encoding device is configured to detect and provide a signal indicative of the rotational position of the shaft 434. The rotation encoding device 436 may include a magnet 437 affixed to the shaft 434 along with a rotary magnetic encoder 438 configured to detect a rotational position of the magnet 437. The rotary magnetic encoder 438 may also be configured to count a degree of rotation to determine a position of the motor and gear train 428. In an embodiment, the rotary magnetic encoder 438 is disposed on and attached to the PCB as part of the PCB circuitry.

Figure 17:
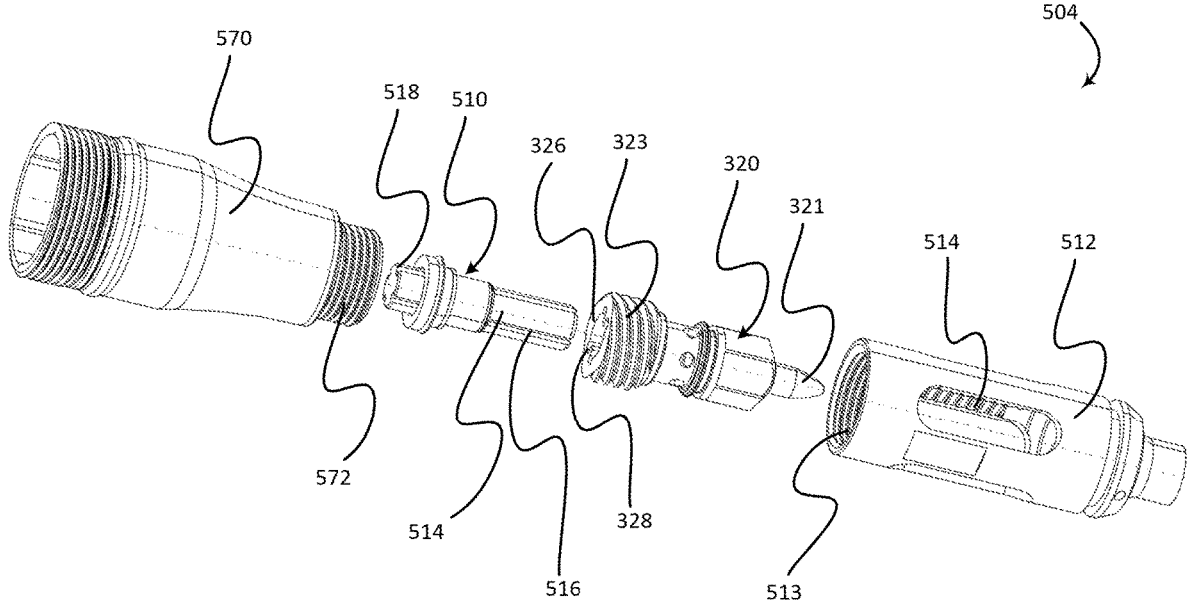
FIG. 17 shows an exploded view of several components of the damping state modification device of the damper of FIG. 7.
Figure 18:
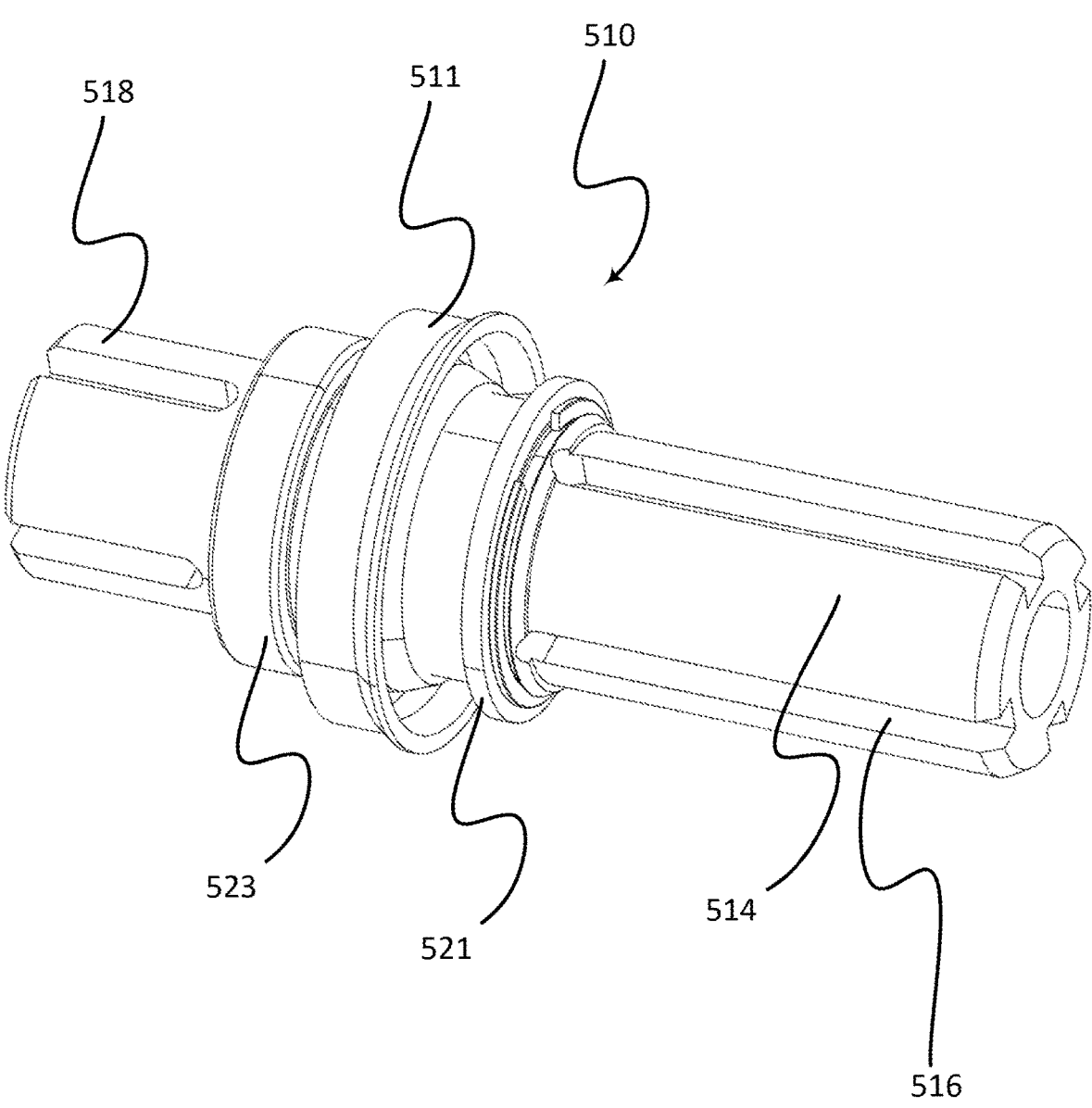
FIG. 18 shows a perspective view of an actuation member of the damping state modification device of the damper of FIG. 7.

FIG. 17 illustrates an exploded view of the suspension state changing mechanism 504 of the actuation device 402. The suspension state changing mechanism 504 may include the actuating member 510 and the obstructing member 320. The suspension state changing mechanism 504 may also include the flow casing 512.

As described above, the flow casing 512 includes the orifice 318 flow structure for the nozzle through which fluid is restricted by the obstructing member 320. The orifice may be a formed as part of the flow casing, or as an assembled part of the flow casing. The obstructing member 320 also includes threading 323 that is configured to rotatably operate with reciprocal threading 513 of the flow casing 512. The threadings 323, 513 of the obstructing member 320 and flow casing 512 interface are configured such that as the obstructing member is rotated about movement axis B this threaded interface causes the needle 321 of the obstructing member 320 to move along the movement axis B relative to the flow casing 512, as is illustrated and described with respect to FIGS. 10-12. This threading interface may be configured, for example through thread pitch and/or height, such that force applied to the obstructing member 320 along the movement axis B will not cause the obstructing member 320 to rotate and/or move linearly along movement axis B. As such, the movement of the obstructing member 320 is controlled through a rotation of the obstructing member 320. Thus, high pressures from fluid acting on the needle 321 will not cause the obstructing member to move out of engagement with the orifice of the flow casing 512. The obstructing member is able to resist rotation, therein allowing other rotatable coupled components (e.g. the motor and/or geartrain) to passively maintain the position of the obstructing member. Also the encoder will not rotate. Therefore, the obstructing member exists as a non-backdrivable element in the rotational engagement system. The non-backdrivable element allows less power to be used to maintain a state of the system, and may provide for more efficiency and better power supply usage. In an embodiment, the movement axis B of the obstructing member is parallel or co-axial with the movement axis 501 of a leg 104 of the suspension element.

The obstructing member 320 also includes a coupling interface 326 configured to couple with the actuating member 510 such that the obstructing member 320 rotates in response to forces applied by the actuating member 510 at the coupling interface 326. For example, as illustrated the obstructing member includes a female socket configured to interact with a male socketing feature or shape of the output portion 514 of the actuating member 510. Such a socketed interface may be configured to allow relative movement between the obstructing member 320 and actuating member 510, while still providing rotational coupling. For example, the coupling interface 326 of the obstructing member 320 may include one or more tabs, ridges, or ribs 328 configured to interface with corresponding slots 516 of the actuating member 510. Thus, the tab 328 may be inserted into the slot 516 so as to rotatably couple the actuating member 510 and the obstructing member 320, but allow linear movement of the tab 328 along the slot 516. Thus, using such an interface, the actuating member 510 and the obstructing member may be rotatably coupled, but provided a mechanism for relative linear movement.

The actuation device housing 570 provides a structure for inclusion of the actuation device 402 and positioning of the device within the damper. The actuation device housing 570 houses the actuation device 402, and is configured to position the output portion 420 of the actuation device 402 in position to be rotatingly coupled with an input coupling 518, or coupling head, of the actuating member 510. The input coupling 518 may include a male socket which couples with a female socket of the output portion 420 to provide rotational coupling. As such, the actuation device 402 causes the actuating member 510 to rotate about movement axis B. In an embodiment, the internal space of the actuation device housing 570 defines the dry portion of the suspension element control device. The actuation device housing 570 may also provide a defining boundary C between the dry portion and the wet portion, in combination with the actuating member 510, creating a sealed boundary between the wet and dry portions, through which the actuating member crosses. The actuation device housing 570 attaches to the flow casing 512 at corresponding threaded sections 572, 513 of the actuation device housing 570 and the flow casing 512, respectively.

The actuating member 510 includes a sealing device 511 to provide the sealing mechanism against a sealing surface of the actuation device housing. For example, the sealing device 511 may be a lip seal, cup seal, o-ring seal, or other seals. The sealing device 511 may be any device operable to provide a seal between wet and dry portions of the damper. The sealing device 511 may provide a sealing mechanism while allowing the actuating member 510 to pass therethrough.

The actuating member 510 also may include fixing structure 521 that is configured to operate with a corresponding feature of the actuation device housing to maintain the position of the actuating member 510 along the movement axis B. The actuation member may also include a rotational surface 523 configured to provide support for any non-axial forces of the system, and to facilitate the rotation of the actuating member 510 when installed in the actuation device housing.

In an embodiment, an actuating member is provided that includes an input portion 518 and an output portion 514 with a sealing device 511 disposed therebetween. The input portion is configured to rotatably couple with an actuation device, and the output portion is configured to rotatably couple with a flow obstructing member to modify the damping characteristics of a damper.

Figure 19:
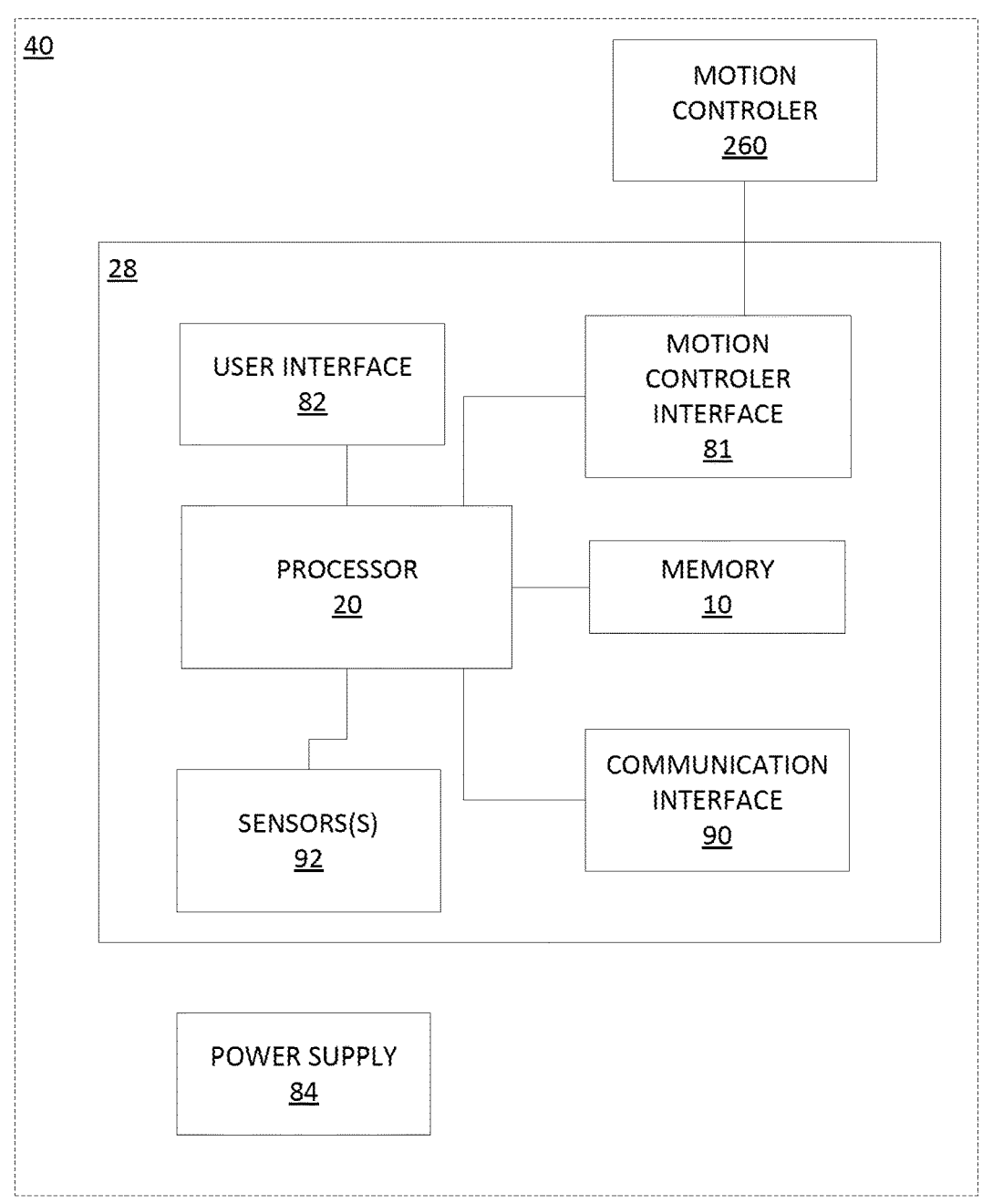
FIG. 19 is a block diagram of the electronic portion of the suspension component.

FIG. 19 is a block diagram of an electronic suspension control system 40 for a bicycle. The system 40 may be used alone to communicate with and/or control bicycle components or other devices. The system 40 includes circuitry 28 which includes at least one processor 20 and a memory 10. In the illustrated embodiment, the circuitry 28 also includes a user interface 82, a motion controller interface 81, and a communication interface 90. The system 40 may also include sensors 92 for indicating status, position, and/or state of a suspension element, or parts thereof. These sensors may be used by the at least one processor 20 to adjust, control, change, and/or monitor the state of the suspension element or suspension system.

Circuitry 28 may also include component connections and/or electrically connecting materials embedded in a substrate material, or otherwise electrically connected to the system 40. The system also includes at least one motion controller 260, such as a motor controller 487, in communication with the motion controller interface 81. Additional, different, or fewer components are possible for the system 40. For example, the user interface 82 may not be included in a circuitry 28 and/or the system. Also, components may be combined. In an embodiment, the system is integrated with a suspension component or element of a bicycle, such as a front fork, for example as is described with respect to FIGS. 2-8.

The processor 20 may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The circuitry 28 is operable to provide a signal causing the motion controller 260 to operate. The circuitry is also operable to receive a signal indicating a motion for the motion controller undertake.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the suspension control system 40, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

In the embodiment illustrated in FIGS. 1-5 the power supply 84 is disposed rearward of suspension elements such as the front fork. As illustrated, the power adapter 202 is configured to attach to a leg or crown of a front fork in a manner that disposes the power supply 84 rearward of the leg or crown, relative to the forward direction of the bicycle. This power supply positioning may provide for protection of the power supply during aggressive riding conditions that may involve external environment factors, such as tree limbs or rocks, coming into contact with the bicycle and/or front fork.

The communication interface 90 provides for data and/or signal communication from the system 40 to another component of the bicycle, or an external device such as a mobile phone or other computing device. The communication interface 90 communicates the data using any operable connection. An operable connection may be one in which signals, physical communications, and/or logical communications may be sent and/or received. An operable connection may include a physical interface, an electrical interface, and/or a data interface. The communication interface 90 may be configured to communicate wirelessly, and as such include one or more antennae. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the communication interface 90 may be configured to transmit a signal indicative of a power determined from a measured strain of a body. Further, the determined power may be transmitted wirelessly.

The motion controller interface 81 provides for data and/or signal communication from one or more motion controllers 260 to the circuitry 28. The interface 81 communicates using wired and/or wireless communication techniques. For example, the interface 81 communicates with the motion controllers 260 using a system bus, or other communication technique. The motion controller interface 81 may include additional electric and/or electronic components, such as an additional processor and/or memory for detecting, communicating, and/or otherwise processing signals of the motion controllers 260.

The user interface 82 may be one or more buttons, keypad, keyboard, mouse, stylus pen, trackball, rocker switch, touch pad, voice recognition circuit, or other device or component for communicating data between a user and the suspension control system 40. The user interface 82 may be a touch screen, which may be capacitive or resistive. The user interface 82 may include a liquid crystal display ("LCD") panel, light emitting diode ("LED"), LED screen, thin film transistor screen, or another type of display, for example the LEDs 505A, 505B shown in the embodiment described with respect to FIG. 21. The user interface 82 may also include audio capabilities, or speakers. The user interface 82 may also be a single LED light and/or an accompanying button to provide input and/or output to the system

40. In an embodiment, the user interface 82 includes an LED indicator. The LED indicator lights to indicate input of the commands or other actions of the suspension control system.

The communication interface 90 is configured to send and/or receive data such as control signals and/or commands to and/or from bicycle components such as the control device 63. The component communication interface 90 communicates the data using any operable connection. An operable connection may be one in which signals, physical communications, and/or logical communications may be sent and/or received. An operable connection may include a physical interface, an electrical interface, and/or a data interface. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof. In an embodiment, AIREA™, a 128 bit wireless protocol is used.

In accordance with various embodiments of the present disclosure, methods described herein may be implemented with software programs executable by a computer system, such as the circuitry 28. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a suspension control system 40 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

In an embodiment, a suspension component for a bicycle is provided. The suspension component includes a first tube having a first end and a second tube having a second end, the first tube and the second tube configured in a telescopic arrangement having the first end as a first distal end of the telescopic arrangement and the second end forming a second distal end of the telescopic arrangement, the telescopic arrangement having an interior space bounded by inner walls of the first tube and the second tube. The suspension component also includes a fluid damper disposed in the interior space, the fluid damper having a plurality of operational states configured to damper or resist movement of the first tube relative to the second tube. The fluid damper includes an internal fluid portion exposed to damping fluid, an internal dry portion isolated from the damping fluid, and an actuating member disposed in both the internal fluid portion and the internal dry portion, the actuating member configured such that movement of the actuating member causes a change of state of the damper.

In an embodiment, the movement of the actuating member comprises movement in both the internal fluid portion and the internal dry portion.

In an embodiment the actuating member is formed as a single piece.

In an embodiment the movement of the actuating member is a rotational movement. The rotational movement may be about a central axis of the telescopic arrangement.

In an embodiment, actuating member comprises an input portion and an output portion.

In an embodiment, the change of state comprises a change in flow characteristics of fluid within the damper.

In an embodiment the damper comprises at least two available states. For example, the available states may include an open flow state and/or a restricted flow state. The restricted flow state may fully constrain the movement of the first distal end relative to the second distal end.

In an embodiment, the damper further comprises a motor and a gearbox disposed in the internal dry portion, the gearbox having an output coupling rotatably coupled to the input portion of the actuating member. The gearbox may be removably coupled to the input portion.

In an embodiment, the internal dry portion is defined by an internal space of a first housing, and the internal fluid portion comprises a second housing, the first housing coupled to the second housing. The actuating member may be disposed in both the first housing and the second housing.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain suspension parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A suspension component for a bicycle, the suspension component comprising:

a first tube having a first end and a second tube having a second end, the first tube and the second tube configured in a telescopic arrangement along a movement axis with the first end as a first distal end of the telescopic arrangement and the second end forming a second distal end of the telescopic arrangement, the telescopic arrangement having an interior space bounded by inner walls of the first tube and the second tube; and a fluid damper disposed in the interior space, the fluid damper having a plurality of operational states configured to resist movement of the first tube relative to the second tube, the fluid damper comprising:

an internal fluid portion exposed to damping fluid, an internal dry portion isolated from the damping fluid, an actuating member disposed in both the internal fluid portion and the internal dry portion, and an obstructing member;

wherein the actuating member is configured such that movement of the actuating member causes the obstructing member to move along the movement axis relative to the actuating member to enact one of the plurality of operational states of the fluid damper, and wherein the fluid damper further comprises a power supply and a motion controller, the motion controller causing the movement of the actuating member, the power supply including a battery configured to provide power to the motion controller and configured to mount to the suspension component in a manner that disposes the power supply rearward of the suspension component.

2. The suspension component of claim 1, wherein the movement of the actuating member comprises movement in both the internal fluid portion and the internal dry portion.

3. The suspension component of claim 1, wherein the actuating member is formed as a single piece.

4. The suspension component of claim 1, wherein the movement of the actuating member is a rotational movement.

5. The suspension component of claim 4, wherein the rotational movement is about a central axis of the telescopic arrangement.

6. The suspension component of claim 1, wherein the actuating member comprises an input coupling.

7. The suspension component of claim 1, wherein the change of enacted operational state comprises a change in flow characteristics of fluid within the fluid damper.

8. The suspension component of claim 1, wherein the fluid damper comprises at least two available operational states.

9. The suspension component of claim 8, wherein the available operational states include an open flow state.

10. The suspension component of claim 9, wherein the available operational states further include a restricted flow state.

11. The suspension component of claim 10, wherein the restricted flow state fully constrains the movement of the movement of the first distal end relative to the second distal end.

12. The suspension component of claim 1, wherein motion controller further comprises a motor and a gearbox disposed in the internal dry portion, the gearbox having an output coupling rotatably coupled to an input coupling of the actuating member.

13. The suspension component of claim 12, wherein the gearbox is removably coupled to the input coupling.

14. The suspension component of claim 12, wherein the internal dry portion is defined by an internal space of a first housing, and the internal fluid portion comprises a second housing, the first housing coupled to the second housing.

15. The suspension component of claim 14, wherein the actuating member is disposed in both the first housing and the second housing.

16. The suspension component of claim 1, further comprising a wireless communication interface configured to receive wireless signals for control of the motion controller.

\* \* \* \* \*